(12) United States Patent
Sigmund et al.

(10) Patent No.: US 9,210,558 B2
(45) Date of Patent: *Dec. 8, 2015

(54) UPDATING VOICEMAIL WITH SELECTIVE ESTABLISHMENT OF PDP CONTEXTS AND DATA SESSIONS

(75) Inventors: William Joseph Sigmund, Cumming, GA (US); Michael Robert Zubas, Marietta, GA (US); Brian Keith Rainer, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 216 days.

This patent is subject to a terminal disclaimer.

(21) Appl. No.: 13/613,525

(22) Filed: Sep. 13, 2012

(65) Prior Publication Data

US 2013/0010937 A1 Jan. 10, 2013

Related U.S. Application Data

(63) Continuation of application No. 12/161,021, filed as application No. PCT/US2008/067176 on Jun. 17, 2008, now Pat. No. 8,351,903.

(60) Provisional application No. 60/969,419, filed on Aug. 31, 2007.

(51) Int. Cl.
*H04M 1/64* (2006.01)
*H04W 4/16* (2009.01)
(Continued)

(52) U.S. Cl.
CPC ............... *H04W 4/16* (2013.01); *G06F 17/289* (2013.01); *H04M 3/02* (2013.01);
(Continued)

(58) Field of Classification Search
USPC ............................... 379/201.05, 88.12, 88.22
See application file for complete search history.

(56) References Cited

U.S. PATENT DOCUMENTS 5,329,579 A 7/1994 Brunson
5,524,137 A 6/1996 Rhee
(Continued)

FOREIGN PATENT DOCUMENTS

EP 0 631 452 12/1994
EP 1 113 631 7/2001
(Continued)

OTHER PUBLICATIONS

U.S. Office Action mailed on Oct. 22, 2013 in U.S. Appl. No. 13/930,210.
(Continued)

*Primary Examiner* — Joseph T Phan
(74) *Attorney, Agent, or Firm* — Hartman & Citrin LLC

(57) ABSTRACT

A method for updating voicemail data at least partially stored at a device can include obtaining a command to update the voicemail data at a device. The device can activate a data session through which voicemail data can be downloaded to the device. In some embodiments, the device can automatically activate a data session upon the occurrence of a trigger event, for example, upon the receipt of a message waiting indicator, or upon powering on the device. In other embodiments, the device can wait for a user action or command to download voicemail data. The action or command can be received at the device after a trigger event, or at any other time. Exemplary devices and communications networks for implementing these and other embodiments are disclosed.

17 Claims, 11 Drawing Sheets

(51) Int. Cl.
*H04M 3/02* (2006.01)
*H04M 3/42* (2006.01)
*H04M 3/533* (2006.01)
*H04M 3/537* (2006.01)
*H04W 12/08* (2009.01)
*G06F 17/28* (2006.01)
*H04W 12/06* (2009.01)

(52) U.S. Cl.
CPC ..... *H04M 3/42017* (2013.01); *H04M 3/42051* (2013.01); *H04M 3/42153* (2013.01); *H04M 3/533* (2013.01); *H04M 3/537* (2013.01); *H04M 3/53325* (2013.01); *H04M 3/53383* (2013.01); *H04W 12/06* (2013.01); *H04W 12/08* (2013.01); *H04M 2201/50* (2013.01); *H04M 2203/4518* (2013.01); *H04M 2203/4545* (2013.01)

(56) References Cited

U.S. PATENT DOCUMENTS

| | | | |
|---|---|---|---|
| 5,572,578 | A | 11/1996 | Lin et al. |
| 5,737,394 | A | 4/1998 | Anderson et al. |
| 5,737,395 | A | 4/1998 | Irribarren |
| 5,809,111 | A | 9/1998 | Matthews |
| 5,915,008 | A | 6/1999 | Dulman |
| 6,005,870 | A | 12/1999 | Leung et al. |
| 6,108,559 | A | 8/2000 | Astrom et al. |
| 6,148,212 | A | 11/2000 | Park et al. |
| 6,246,871 | B1 | 6/2001 | Ala-Laurila |
| 6,335,962 | B1 | 1/2002 | Ali et al. |
| 6,351,523 | B1 | 2/2002 | Detlef |
| 6,360,272 | B1 | 3/2002 | Lincke et al. |
| 6,480,885 | B1 | 11/2002 | Olivier |
| 6,522,727 | B1 | 2/2003 | Jones |
| 6,615,036 | B1 * | 9/2003 | Haas et al. ............ 455/413 |
| 6,751,298 | B2 | 6/2004 | Bhogal et al. |
| 6,829,334 | B1 | 12/2004 | Zirngibl |
| 6,868,143 | B1 | 3/2005 | Menon et al. |
| 6,879,847 | B1 | 4/2005 | Kato |
| 6,912,275 | B1 | 6/2005 | Kaplan |
| 6,937,868 | B2 | 8/2005 | Himmel et al. |
| 6,981,023 | B1 | 12/2005 | Hamilton et al. |
| 7,095,828 | B1 | 8/2006 | Elliot et al. |
| 7,142,648 | B1 | 11/2006 | Miller |
| 7,171,186 | B2 | 1/2007 | Miyachi et al. |
| 7,248,857 | B1 * | 7/2007 | Richardson et al. ...... 455/413 |
| 7,277,529 | B1 | 10/2007 | Wuthnow et al. |
| 7,283,809 | B1 | 10/2007 | Weinman |
| 7,369,648 | B1 | 5/2008 | Chang |
| 7,463,619 | B1 | 12/2008 | Prokop et al. |
| 7,680,491 | B2 | 3/2010 | Zabawskyj et al. |
| 7,738,833 | B2 | 6/2010 | Bettis et al. |
| 7,796,977 | B2 | 9/2010 | Vander Veen |
| 7,826,831 | B2 | 11/2010 | Bettis et al. |
| 7,894,580 | B2 | 2/2011 | Veen et al. |
| 8,023,931 | B2 | 9/2011 | Katz et al. |
| 8,320,535 | B2 | 11/2012 | Alperin et al. |
| 8,644,463 | B2 * | 2/2014 | Demmitt et al. ......... 379/88.14 |
| 2002/0015403 | A1 | 2/2002 | McConnell et al. |
| 2002/0037075 | A1 | 3/2002 | Flanagan |
| 2002/0049768 | A1 | 4/2002 | Peek et al. |
| 2002/0077098 | A1 | 6/2002 | Tilks et al. |
| 2002/0112007 | A1 | 8/2002 | Wood et al. |
| 2002/0115429 | A1 | 8/2002 | Deluca et al. |
| 2003/0091169 | A1 | 5/2003 | Cain |
| 2003/0099341 | A1 | 5/2003 | Williams |
| 2003/0220784 | A1 | 11/2003 | Fellenstein et al. |
| 2004/0023643 | A1 | 2/2004 | Vander Veen et al. |
| 2004/0081088 | A1 | 4/2004 | Schinner et al. |
| 2004/0139471 | A1 | 7/2004 | Geen et al. |
| 2004/0146147 | A1 | 7/2004 | Picard et al. |
| 2004/0248594 | A1 | 12/2004 | Wren |
| 2004/0252679 | A1 | 12/2004 | Williams et al. |
| 2004/0264658 | A1 | 12/2004 | Cline et al. |
| 2005/0059384 | A1 * | 3/2005 | Kuusinen et al. .......... 455/414.1 |
| 2005/0089149 | A1 | 4/2005 | Elias |
| 2005/0102368 | A1 | 5/2005 | Forman et al. |
| 2005/0113078 | A1 | 5/2005 | Deitrich |
| 2005/0186944 | A1 | 8/2005 | True et al. |
| 2005/0213715 | A1 | 9/2005 | Winick |
| 2006/0003745 | A1 | 1/2006 | Gogic |
| 2006/0025114 | A1 | 2/2006 | Bales et al. |
| 2006/0025140 | A1 | 2/2006 | Bales et al. |
| 2006/0031470 | A1 | 2/2006 | Chen et al. |
| 2006/0059361 | A1 | 3/2006 | Paden |
| 2006/0062356 | A1 | 3/2006 | Vendrow |
| 2006/0171511 | A1 | 8/2006 | Liu et al. |
| 2006/0173959 | A1 | 8/2006 | McKelvie et al. |
| 2006/0239419 | A1 | 10/2006 | Joseph et al. |
| 2006/0251222 | A1 | 11/2006 | Abramson et al. |
| 2006/0253584 | A1 | 11/2006 | Dixon et al. |
| 2006/0281443 | A1 | 12/2006 | Chen et al. |
| 2007/0038483 | A1 | 2/2007 | Wood |
| 2007/0066284 | A1 | 3/2007 | Gatzke et al. |
| 2007/0127632 | A1 | 6/2007 | Swingle et al. |
| 2007/0127663 | A1 | 6/2007 | Bae |
| 2007/0140443 | A1 | 6/2007 | Woodring |
| 2007/0143106 | A1 | 6/2007 | Dunsmuir |
| 2007/0173233 | A1 | 7/2007 | Vander Veen et al. |
| 2007/0180032 | A1 | 8/2007 | Pearson |
| 2007/0180504 | A1 | 8/2007 | Hung |
| 2007/0207785 | A1 | 9/2007 | Chatterjee et al. |
| 2007/0213050 | A1 | 9/2007 | Jiang |
| 2007/0223666 | A1 | 9/2007 | Teague |
| 2007/0239833 | A1 | 10/2007 | Alperin et al. |
| 2007/0287453 | A1 | 12/2007 | Wang |
| 2008/0008163 | A1 | 1/2008 | Castell et al. |
| 2008/0008299 | A1 | 1/2008 | Didcock et al. |
| 2008/0056459 | A1 | 3/2008 | Vallier et al. |
| 2008/0062246 | A1 | 3/2008 | Woodworth et al. |
| 2008/0062938 | A1 | 3/2008 | Gil-soo et al. |
| 2008/0081609 | A1 | 4/2008 | Burgan et al. |
| 2008/0140767 | A1 | 6/2008 | Rao et al. |
| 2008/0167007 | A1 | 7/2008 | Novick et al. |
| 2008/0167010 | A1 | 7/2008 | Novick et al. |
| 2008/0167013 | A1 | 7/2008 | Novick et al. |
| 2008/0167014 | A1 | 7/2008 | Novick et al. |
| 2008/0188204 | A1 | 8/2008 | Gavner et al. |
| 2008/0200152 | A1 | 8/2008 | Moore |
| 2008/0207176 | A1 | 8/2008 | Brackbill et al. |
| 2008/0207184 | A1 | 8/2008 | Wassingbo et al. |
| 2008/0243513 | A1 | 10/2008 | Bucchieri et al. |
| 2008/0260118 | A1 | 10/2008 | Lyle |
| 2008/0298459 | A1 | 12/2008 | Yang et al. |
| 2008/0300873 | A1 | 12/2008 | Siminoff |
| 2009/0149220 | A1 | 6/2009 | Camilleri et al. |
| 2009/0239507 | A1 | 9/2009 | Sigmund et al. |
| 2009/0253407 | A1 | 10/2009 | Sigmund et al. |
| 2009/0253412 | A1 | 10/2009 | Sigmund et al. |
| 2009/0253413 | A1 | 10/2009 | Sigmund et al. |
| 2009/0290695 | A1 | 11/2009 | Schulzrinne et al. |
| 2010/0159888 | A1 | 6/2010 | Sigmund et al. |
| 2010/0159889 | A1 | 6/2010 | Sigmund et al. |
| 2010/0159890 | A1 | 6/2010 | Sigmund et al. |
| 2010/0159891 | A1 | 6/2010 | Sigmund et al. |
| 2010/0166161 | A1 | 7/2010 | Dhawan et al. |
| 2010/0167699 | A1 | 7/2010 | Sigmund et al. |
| 2010/0189229 | A1 | 7/2010 | Sigmund et al. |
| 2010/0222024 | A1 | 9/2010 | Sigmund et al. |
| 2011/0085646 | A1 | 4/2011 | Sigmund et al. |
| 2013/0012173 | A1 | 1/2013 | Sigmund et al. |
| 2013/0040614 | A1 | 2/2013 | Sigmund et al. |

FOREIGN PATENT DOCUMENTS

| | | |
|---|---|---|
| EP | 1 434 415 | 6/2004 |
| EP | 1 599 022 | 11/2005 |
| KR | 20050001246 | 1/2005 |
| WO | WO 97/45991 | 12/1997 |
| WO | WO 98/03005 | 1/1998 |
| WO | WO 00/73947 | 12/2000 |
| WO | WO 02/065745 | 8/2002 |

(56) References Cited

FOREIGN PATENT DOCUMENTS

| | | |
|---|---|---|
| WO | WO 2004/046895 | 6/2004 |
| WO | WO 2007/081929 | 7/2007 |
| WO | WO 2007/095510 | 8/2007 |
| WO | WO 2007/096866 | 8/2007 |
| WO | WO 2008/034555 | 3/2008 |
| WO | WO 2009/029296 | 3/2009 |
| WO | WO 2009/029297 | 3/2009 |
| WO | WO 2009/029298 | 3/2009 |
| WO | WO 2009/029313 | 3/2009 |
| WO | WO 2009/029314 | 3/2009 |
| WO | WO 2009/029323 | 3/2009 |
| WO | WO 2009/029324 | 3/2009 |
| WO | WO 2009/029328 | 3/2009 |
| WO | WO 2009/029330 | 3/2009 |
| WO | WO 2010/002382 | 1/2010 |

OTHER PUBLICATIONS

U.S. Notice of Allowance mailed on Dec. 30, 2013 in U.S. Appl. No. 12/160,931.
U.S. Office Action mailed on Jan. 21, 2014 in U.S. Appl. No. 13/654,480.
U.S. Office Action mailed on Aug. 16, 2013 in U.S. Appl. No. 13/654,480.
U.S. Notice of Allowance dated Feb. 28, 2013 in U.S. Appl. No. 12/161,064.
U.S. Office Action dated Feb. 28, 2013 in U.S. Appl. No. 13/654,480.
U.S. Appl. No. 13/751,505, filed Jan. 28, 2013 to Sigmund et al.
U.S. Appl. No. 13/785,710, filed Mar. 5, 2013 to Sigmund et al.
U.S. Notice of Allowance dated Jan. 31, 2013 in U.S. Appl. No. 12/485,961.
U.S. Notice of Allowance dated Dec. 27, 2012 in U.S. Appl. No. 13/616,198.
U.S. Office Action dated Oct. 4, 2012 in U.S. Appl. No. 12/485,484.
U.S. Office Action dated Oct. 2, 2012 in U.S. Appl. No. 12/485,961.
U.S. Office Action dated Sep. 14, 2012 in U.S. Appl. No. 12/161,064.
U.S. Notice of Allowance dated Nov. 16, 2012 in U.S. Appl. No. 12/161,027.
U.S. Office Action dated Oct. 11, 2012 in U.S. Appl. No. 12/160,946.
U.S. Notice of Allowance dated Oct. 25, 2012 in U.S. Appl. No. 12/160,940.
U.S. Notice of Allowance dated Nov. 23, 2012 in U.S. Appl. No. 12/485,335.
U.S. Notice of Allowance dated Nov. 21, 2012 in U.S. Appl. No. 12/477,971.
U.S. Notice of Allowance dated May 26, 2011 in U.S. Appl. No. 12/201,945.
U.S. Official Action dated Sep. 19, 2011 in U.S. Appl. No. 12/477,971.
U.S. Official Action dated Apr. 25, 2012 in U.S. Appl. No. 12/477,971.
U.S. Official Action dated Oct. 13, 2011 in U.S. Appl. No. 12/485,335.
U.S. Official Action dated May 22, 2012 in U.S. Appl. No. 12/485,335.
U.S. Official Action dated Apr. 27, 2012 in U.S. Appl. No. 12/160,931.
U.S. Office Action dated Aug. 30, 2012 in U.S. Appl. No. 12/160,931.
U.S. Official Action dated Dec. 22, 2010 in U.S. Appl. No. 12/160,940.
U.S. Official Action dated May 31, 2011 in U.S. Appl. No. 12/160,940.
U.S. Official Action dated Apr. 24, 2012 in U.S. Appl. No. 12/160,940.
U.S. Official Action dated Apr. 26, 2012 in U.S. Appl. No. 12/160,946.
U.S. Official Action dated Nov. 4, 2011 in U.S. Appl. No. 12/160,956.
U.S. Official Action dated Jun. 6, 2012 in U.S. Appl. No. 12/160,956.
U.S. Official Action dated Jan. 12, 2011 in U.S. Appl. No. 12/161,021.
U.S. Official Action dated Jun. 1, 2011 in U.S. Appl. No. 12/161,021.
U.S. Official Action dated Dec. 15, 2011 in U.S. Appl. No. 12/161,021.
U.S. Notice of Allowance dated Jun. 21, 2012 in U.S. Appl. No. 12/161,021.
U.S. Official Action dated Nov. 29, 2010 in U.S. Appl. No. 12/161,027.
U.S. Official Action dated May 10, 2011 in U.S. Appl. No. 12/161,027.
U.S. Official Action dated Nov. 23, 2011 in U.S. Appl. No. 12/161,027.
U.S. Office Action dated Jul. 30, 2012 in U.S. Appl. No. 12/161,027.
U.S. Official Action dated Dec. 27, 2010 in U.S. Appl. No. 12/161,033.
U.S. Official Action dated May 31, 2011 in U.S. Appl. No. 12/161,033.
U.S. Official Action dated Nov. 29, 2011 in U.S. Appl. No. 12/161,033.
U.S. Official Action dated Jun. 6, 2012 in U.S. Appl. No. 12/161,033.
U.S. Notice of Allowance dated Jul. 24, 2012 in U.S. Appl. No. 12/161,033.
U.S. Official Action dated Dec. 23, 2010 in U.S. Appl. No. 12/161,035.
U.S. Official Action dated Jun. 2, 2011 in U.S. Appl. No. 12/161,035.
U.S. Official Action dated Dec. 2, 2011 in U.S. Appl. No. 12/161,035.
U.S. Official Action dated Jul. 18, 2012 in U.S. Appl. No. 12/161,035.
U.S. Official Action dated Jan. 24, 2011 in U.S. Appl. No. 12/161,064.
U.S. Official Action dated Jul. 8, 2011 in U.S. Appl. No. 12/161,064.
U.S. Official Action dated Jan. 30, 2012 in U.S. Appl. No. 12/161,064.
U.S. Official Action dated Jan. 19, 2011 in U.S. Appl. No. 12/161,076.
U.S. Official Action dated Jul. 1, 2011 in U.S. Appl. No. 12/161,076.
U.S. Official Action dated Jan. 17, 2012 in U.S. Appl. No. 12/161,076.
U.S. Notice of Allowance dated Jul. 17, 2012 in U.S. Appl. No. 12/161,076.
International Search Report & Written Opinion dated Sep. 18, 2008 in PCT Application PCT/US08/67612.
International Search Report & Written Opinion dated Aug. 1, 2008 in PCT Application PCT/US08/61493.
International Search Report & Written Opinion dated Nov. 12, 2008 in PCT Application PCT/US08/65046.
International Search Report & Written Opinion dated Mar. 13, 2009 in PCT Application PCT/US08/68738.
International Search Report & Written Opinion dated Oct. 29, 2008 in PCT Application PCT/US08/67176.
International Search Report & Written Opinion dated Sep. 4, 2008 in PCT Application PCT/US08/54074.
International Search Report & Written Opinion dated Sep. 3, 2008 in PCT Application PCT/US08/61592.
International Search Report & Written Opinion dated Sep. 4, 2008 in PCT Application PCT/US08/67152.
International Search Report & Written Opinion dated Nov. 6, 2008 in PCT Application PCT/US08/67591.
International Search Report & Written Opinion dated Aug. 28, 2008 in PCT Application PCT/US08/61437.
U.S. Office Action dated Feb. 27, 2015 in U.S. Appl. No. 14/450,971.
U.S. Office Action dated Sep. 1, 2015 in U.S. Appl. No. 14/534,762.

* cited by examiner

UPDATING VOICEMAIL WITH SELECTIVE ESTABLISHMENT OF PDP CONTEXTS AND DATA SESSIONS

RELATED APPLICATION

This application is a continuation of U.S. patent application Ser. No. 12/161,021 entitled "Systems And Methods For Updating Voicemail With Selective Establishment Of PDP Contexts And Data Sessions," filed Jul. 16, 2008, now 8,351,903, which is a National Phase Application of PCT Application No. PCT/US08/67176 filed Jun. 17, 2008, which claims priority to U.S. Provisional Patent Application No. 60/969,419, filed Aug. 31, 2007. U.S. patent application Ser. No. 12/161,021 and U.S. Prov. Pat. App. No. 60/969,419 are each incorporated herein by reference in their entireties.

TECHNICAL FIELD

The present disclosure relates generally to voicemail service and, more particularly, to updating voicemail with selective establishment of packet data protocol (PDP) contexts and data sessions.

BACKGROUND

Voicemail systems allow a calling party to leave a message for a called party, for example, when the called party is unavailable. Traditional voicemail systems (referred to herein as plain old voicemail or POVM) often allow a subscriber to place a call to a voicemail system to access messages stored in his or her voicemail box. This is often done through a telephone user interface (TUI) that facilitates interaction between the subscriber and the voicemail system. The TUI provides functions for the subscriber to listen to messages, skip messages, delete messages, and save messages. The TUI can also provide functions for the subscriber to set a voicemail greeting, record a voicemail greeting, record a name, and set/change a password.

With some voicemail systems, a subscriber with multiple voicemail messages is required to listen to, skip, delete, or save each message while reviewing the voicemail box. This is time consuming and can be frustrating for the subscriber in situations where an important message has been deposited, requiring the subscriber to listen to, skip, delete or save each message in search of the important message.

To help reduce the need to search through multiple messages, some voicemail systems have been developed that can allow messages to be stored based on a priority scheme to increase the efficiency of listening to voicemail messages. Some of these systems use a telephone number of the caller to identify a priority for a message and position the voicemail messages in order based on the assigned priorities. When the recipient accesses the voicemail system to acquire voicemail messages, the recipient can be presented with voicemail messages in order of the priority relating to the caller's telephone number. Other systems organize messages based upon the time and/or date of the message deposit to the voicemail system. With many of these voicemail systems, the recipient often must listen to and/or skip through multiple voicemail messages to find an important message. However, an important message can be easily relegated to a position of low importance if the subscriber previously has not set the priority for the caller, or if other less important messages are received after the more important message is deposited to the voicemail system, for example.

SUMMARY

According to one embodiment of the disclosure, a method for updating voicemail content without automatically activating a packet data protocol (PDP) context upon powering on a device can include powering on a device that is configured to update voicemail data that is at least partially stored at the device. The device can also be configured to allow or disallow automatic updating of the voicemail data when the device is powered on.

In some embodiments, the method includes receiving, at the device, a notification that new data has been deposited at a voicemail system associated with the device, obtaining a command at the device corresponding to an option to update the voicemail data, and updating the voicemail data. Obtaining a command at the device can include initialization of a voicemail application at the device.

In some embodiments, the method includes displaying, at the device, a message waiting indication and an option to enter a command that prompts the device to update the voicemail data, and obtaining a command includes selection of the option that prompts the device to update the voicemail data.

In some embodiments of the method, updating the voicemail data includes activating a PDP context and establishing a data session to update the voicemail data, exchanging data with at least one VMS, and updating the voicemail data stored at least partially at the device by transferring data via the established data session context.

In some embodiments, the device can determine, upon, after, or during receipt of a command to download voicemail data, whether or not the device is configured to allow data communications. Additionally, or alternatively, the device can determine whether the device is configured to automatically download voicemail content after receiving, at the device, notification of new voicemail data. Additionally, or alternatively, the device can determine if the device is configured to override, for the purpose of downloading voicemail data, the setting corresponding to allowance or disallowance of data communications.

Conflicts between settings can be resolved through the application of various rules, methods, routines, or the like. In some embodiments, the device automatically downloads voicemail data if the device is configured to allow data communications and is configured to allow automatic download of voicemail data. In other embodiments, the device automatically downloads voicemail data if the device is configured to disallow data communications, to override the setting corresponding to disallowance of data communications for the purpose of downloading voicemail data, and to automatically download voicemail data.

According to another embodiment of the disclosure, a method for updating voicemail content without automatically activating a PDP context upon receipt of a message waiting indication can include receiving a message waiting indication at a device. The device can be configured to update data relating to voicemail data that is at least partially stored at the device upon determining that the device should update the data relating to the voicemail data. The device can be configured to allow or disallow automatic updating of the voicemail data when the message waiting indication is received at the device.

In some embodiments, the method includes displaying, at the device, a message waiting indication and an option to enter a command that prompts the device to update the voicemail data. The device can obtain a command at the device corresponding to an option to update the voicemail data and can, upon obtaining the command, update the voicemail data.

In some embodiments of the method, obtaining a command at the device includes selection of the option that prompts the device to update the voicemail data. Updating the voicemail data can include activating a packet data protocol PDP context and establishing a data session to update the data relating to the voicemail data, exchanging data with at least one voicemail system (VMS), and updating the voicemail data stored at least partially at the device by transferring data via the established data session.

In some embodiments, determining whether to update the voicemail data includes examining the device settings to determine whether or not the device is configured to allow data communications. Additionally, or alternatively, the determining can include examination of the device settings to determine whether or not the device is configured to automatically download voicemail content upon receiving notification of new voicemail data. Additionally, or alternatively, the determining can include examination of the device settings to determine whether or not the device is configured to override, for the purpose of downloading voicemail data, the setting corresponding to allowance or disallowance of data communications.

Conflicts between settings can be resolved through the application of various rules, methods, routines, and the like. In some embodiments, the device automatically downloads voicemail data if the device is configured to allow data communications and is configured to allow automatic download of voicemail data. In other embodiments, the device automatically downloads voicemail data if the device is configured to disallow data communications, to override the setting corresponding to disallowance of data communications for the purpose of downloading voicemail data, and to automatically download voicemail data.

According to another embodiment of the disclosure, a device can include a memory configured to store instructions corresponding to voicemail settings, a communications component with which the device can communicate with one or more elements of a communications network, and a processor configured to execute the instructions stored in the memory. The device can be configured to allow or disallow automatic updating of the voicemail data when the device is powered on.

In some embodiments, the instructions stored in the memory can include instructions for setting whether or not the device is configured to allow data communications. Additionally, or alternatively, the instructions stored in the memory can include instructions for setting whether or not the device is configured to automatically download voicemail content after receiving, at the device, notification of new voicemail data. Additionally, or alternatively, the instructions stored in the memory can include instructions for setting whether or not the device is configured to override, for the purpose of downloading voicemail data, the setting corresponding to allowance or disallowance of data communications.

Conflicts between the various instructions stored in the device memory can be resolved through the application of various rules, methods, routings, and the like. In some embodiments, the device can automatically download voicemail data if the device is configured to allow data communications and to allow automatic download of voicemail data. In other embodiments, the device can automatically download voicemail data if the device is configured to disallow data communications, to override the setting corresponding to disallowance of data communications for the purpose of downloading voicemail data, and to automatically download voicemail data.

According to another embodiment of the disclosure, a device can include a memory configured to store instructions corresponding to voicemail settings, a communications component with which the device communicates with one or more elements of a communications network, and with which the device receives one or more message waiting indicators, and a processor configured to execute the instructions stored in the memory. The device can be configured to allow or disallow automatic updating of the voicemail data when the device receives a message waiting indicator.

In some embodiments, the instructions stored in the memory can include instructions for setting whether or not the device is configured to allow data communications. Additionally, or alternatively, the instructions stored in the memory can include instructions for setting whether or not the device is configured to automatically download voicemail content after receiving, at the device, notification of new voicemail data. Additionally, or alternatively, the instructions stored in the memory can include instructions for setting whether or not the device is configured to override, for the purpose of downloading voicemail data, the setting corresponding to allowance or disallowance of data communications.

Conflicts between the various instructions stored in the device memory can be resolved through the application of various rules, methods, routings, and the like. In some embodiments, the device is configured to automatically download voicemail data if the device is configured to allow data communications and to allow automatic download of voicemail data. In other embodiments, the device is configured to automatically download voicemail data if the device is configured to disallow data communications, to override the setting corresponding to disallowance of data communications for the purpose of downloading voicemail data, and to automatically download voicemail data.

According to another exemplary embodiment of the disclosure, a communications network over which a device updates voicemail without automatically activating a PDP context and establishing a data session on device startup, can include one or more voicemail systems associated with the device, and one or more content delivery servers associated with the one or more voicemail systems.

According to another exemplary embodiment of the disclosure, a communications network over which a device updates voicemail without automatically activating a PDP context and establishing a data session upon receipt of a message waiting notification, can include one or more voicemail systems associated with the device, one or more content delivery servers associated with the one or more voicemail systems, and one or more message waiting indicator servers for sending message waiting indicators to the device, the message waiting indicators informing the device that new voicemail has been deposited at the one or more voicemail systems.

These and additional features of the present disclosure will become apparent with reference to the attached drawings, wherein:

DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
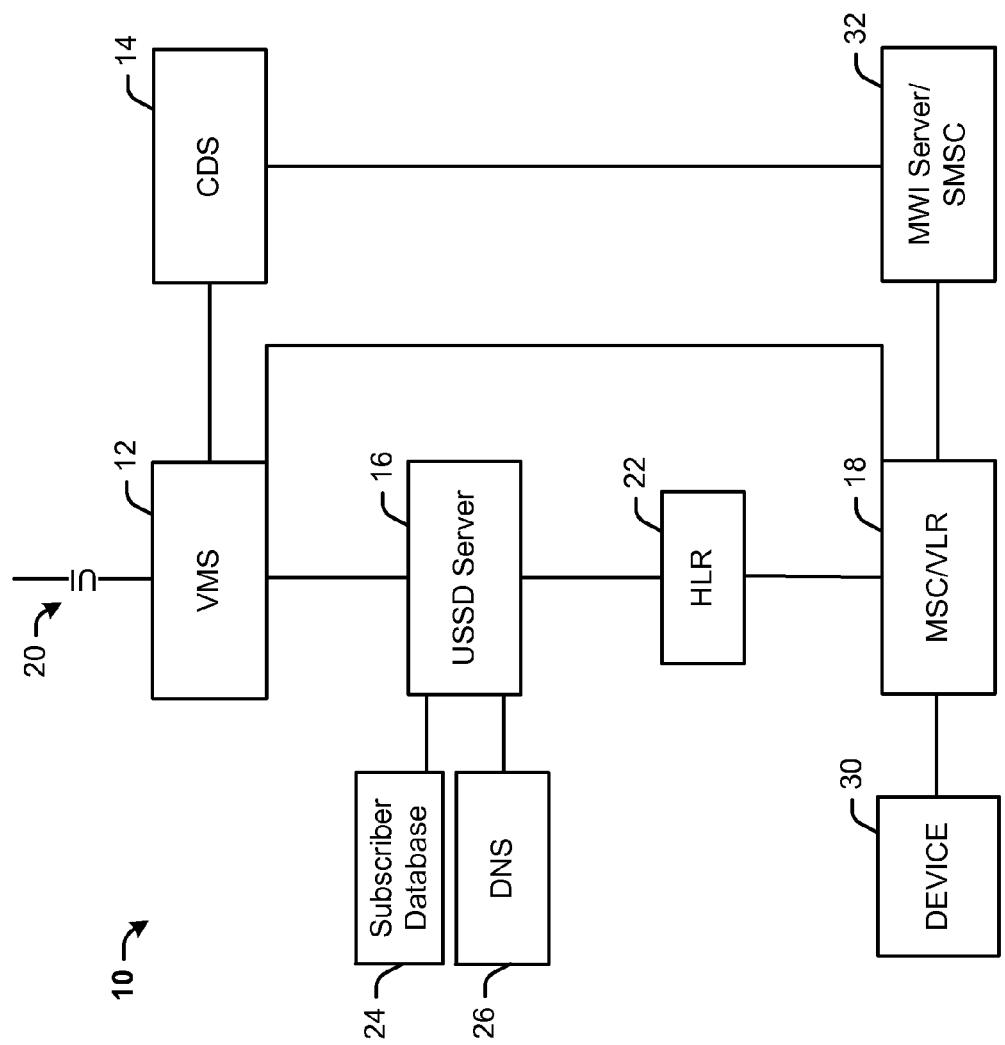
FIG. 1 schematically illustrates a portion of an exemplary communications network with which some embodiments of the present disclosure can be implemented.

Referring now to the drawings wherein like numerals represent like elements throughout the several views, FIG. 1 schematically illustrates a portion of an exemplary wireless communications network 10 in which some embodiments of the present disclosure can be implemented. By way of example, the wireless communications network 10 can be configured as a 2G GSM (Global System for Mobile communications) network and can provide data communications via GPRS (General Packet Radio Service), and EDGE (Enhanced Data rates for GSM Evolution). By way of further example, the wireless communications network 10 can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The wireless communications network 10 is also compatible with future mobile communications standards including, but not limited to, pre-4G and 4G, for example. The wireless communications network 10 can be configured to provide messaging services via Short Message Service (SMS), Multimedia Message Service (MMS), instant messaging and unstructured supplementary service data (USSD), for example. The wireless communications network 10 can also be configured to provide advanced voicemail messaging features, such as visual voicemail.

The illustrated wireless communications network 10 includes a voicemail system (VMS) 12 that is illustrated as being in communication with a content delivery server (CDS) 14, a USSD server 16, and a mobile switching center and visiting location register (MSC/VLR) 18, although this is not necessarily the case. The VMS 12 can include a user interface (UI) 20. The UI 20 can include a telephone user interface (TUI), a web UI, a UI on a remote device, and the like.

The USSD server 16 can be configured to receive, decode, and process new USSD messages, perform database queries to retrieve the VMS hostname serving a subscriber, perform database queries to resolve the VMS hostname to the corresponding IP address, obtain the subscriber's voicemail class of service (COS), and send the subscriber's voicemail COS to the subscriber's mobile device. The USSD server 16 is illustrated as being in communication with a home location register (HLR) 22, a subscriber database 24, and a domain name server (DNS) 26 to facilitate these and other functions.

The subscriber database 24 can be configured to store and manage subscriber data, such as, for example, account information, billing information, services information, and equipment information for a plurality of subscribers. The DNS server 26 can be configured to maintain a database for resolving host names and IP addresses for various network nodes, such as the VMS 12, for example. The USSD server 16 can retrieve the VMS hostname serving a subscriber from the subscriber database 24 and query the DNS 26 by specifying the VMS hostname to resolve the corresponding IP address.

The HLR 22 can be configured to provide routing information for mobile-terminated calls and short message service (SMS) messages. The HLR 22 is illustrated as being in communication with the MSC/VLR 18. The MSC/VLR 18 is in communication with a device 30 and a short message service center (SMSC) 32. The device 30 can be, but is not limited to, a user equipment, a mobile terminal, a cellular telephone, a personal digital assistant (PDA), a handheld computer, or combinations thereof, and the like. The SMSC 32 can be configured to deliver SMS messages and message waiting indicator (MWI) messages.

The VMS 12 can be configured to store a plurality of voicemail accounts. Each voicemail account can include a voicemail box in which voicemail messages can be deposited for a subscriber. The number of voicemail messages capable of being stored per account can be determined by the voicemail service provider or any third party provider, such as the system manufacturer, for example. The maximum voicemail message length can also be set, if desired. The number of voicemail messages and the maximum voicemail message length can be configured on the VMS 12.

The VMS 12 is configured to be accessible via traditional or plain old voicemail (POVM) methods and visual voicemail (VVM) methods described herein. State changes to voicemail messages can be updated at the VMS 12, the device 30, or both. State changes can be requested through a UI 20, for example, through a TUI via POVM methods. Alternatively, status changes can be requested directly on the device 30, for example, through a graphical user interface (GUI) via VVM methods, through a web UI, and the like. Synchronization can be useful to help ensure automatic and full synchronization between the subscriber's device 30 and the VMS 12 so that the latest voicemail information is stored on the subscriber's device 30. However, it should be appreciated that synchronization is not desirable in some embodiments.

The subscriber's VMS-hosted voicemail box can recognize and maintain message states for each message, such as, but not limited to, an unheard—new state, a skipped state, an archived—read state, and a saved—read state. Deleted messages can be deleted from the VMS 12, for example, by entering a delete command via the UI 20. Messages can be deleted on the VMS 12, the device 30, and/or both. Alternatively, messages can remain accessible on the device 30 and/ or on the VMS 12. In some embodiments, the VMS 12 can discard all messages after the device 30 has successfully received and stored the available message content.

The device 30 can also store messages at a voicemail box defined by one or more memory locations, for example, a portion of the device memory 44. The device 30 also can recognize and maintain message states. The device 30 voicemail box can have message states for each message including, but not limited to, an unheard—new state, a skipped state, a saved—read state, an archived—read state, and a deleted state. The device 30 does not require a skipped state, for example, in some embodiments wherein VVM provides an interface that allows a subscriber to access any message regardless of the order in which the message was received and is not subject to restraint of a priority scheme. In some embodiments, the device 30 voicemail box deleted state can be configured such that the message is available for recovery. As such, the deleted state substantially can be an indication that the message has been deleted, for example, by moving the deleted message to a deleted items, or a recycled items, folder. Deleted items can be made available for a time specified by either the subscriber via a device input or by the voicemail service provider, and/or indefinitely.

Messages used to establish and/or update a VVM account can be sent and/or received using a variety of protocols, such as, but not limited to, short message peer-to-peer (SMPP), domain name server (DNS) protocol, lightweight directory access protocol (LDAP), unstructured supplementary service data (USSD) protocol, Internet message access protocol version 4 (IMAP4), hypertext transfer protocol (HTTP), and HTTP over secure socket layer (HTTPS), for example. Moreover, protocols to provide or enhance the security of data transmission to and from the various nodes described above can be provided via cryptographic protocols, such as, but not limited to, transport layer security (TLS), secure sockets layer (SSL), improvements, versions, variations, or evolutions thereof, and the like. The description provided below assumes an understanding of these protocols and as such further explanation is not provided. The use of alternative protocols or additional protocols to acquire similar results is deemed to be within the scope of the present disclosure and the attached claims.

Figure 2:
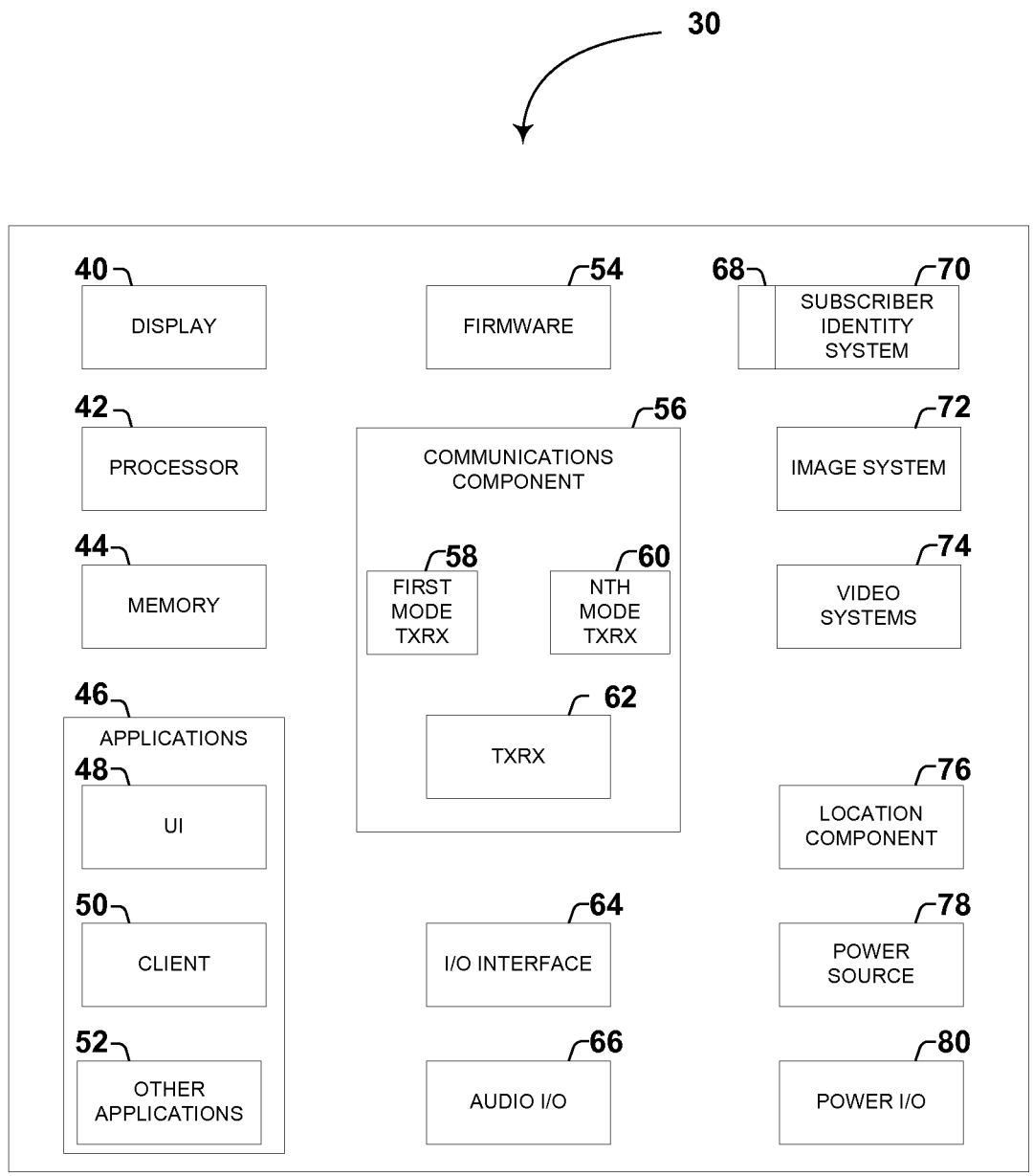
FIG. 2 schematically illustrates a block diagram of an exemplary mobile device for use with some embodiments of the present disclosure.

FIG. 2 illustrates a schematic block diagram of an exemplary mobile communications device 30 for use in accordance with some embodiments of the present disclosure. Although no connections are shown between the components illustrated in FIG. 2, the components can interact with each other to carry out device functions. It should be understood that FIG. 2 and the following description are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

As illustrated, the mobile communications device 30 can be a multimode handset. The device 30 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 30.

The device 30 can include a display 40 for displaying multimedia such as, for example, a graphical user interface (GUI), text, images, visual voicemail, video, telephony functions such as Caller ID data, setup functions, menus, music, metadata, messages, wallpaper, graphics, internet content, device status, preferences settings, map data, location data, and the like. The device 30 can include a processor 42 for controlling, and/or processing data. A memory 44 can interface with the processor 42 for the storage of data and/or applications 46. An application 46 can include, for example, video playback software, voicemail software, visual voicemail software, conversion software, archival software, forwarding software, audio playback software, music player software, email software, translation software, speech to text software, text to speech software, messaging software, combinations thereof, and the like. The application 46 can also include a user interface (UI) application 48. The UI application 48 can interface with a client 50 (e.g., an operating system) to facilitate user interaction with device functionality and data, for example, answering/initiating calls, entering/ deleting data, configuring settings, address book manipulation, multimode interaction, and the like. The applications 46 can include other applications 52 such as, for example, firmware, visual voicemail software, add-ons, plug-ins, voice recognition, call voice processing, voice recording, messaging, e-mail processing, video processing, image processing, voicemail file archival, converting, forwarding, music playback, combinations thereof, and the like, as well as subsystems and/or components. The applications 46 can be stored in the memory 44 and/or in a firmware 54, and can be executed by the processor 42. The firmware 54 can also store code for execution during initialization of the device 30.

A communications component 56 can interface with the processor 42 to facilitate wired/wireless communications with external systems including, for example, cellular networks, VoIP networks, LAN, WAN, MAN, PAN, that can be implemented using WI-FI, WI-MAX, combinations and/or improvements thereof, and the like. The communications component 56 can also include a multimode communications subsystem for providing cellular communications via different cellular technologies. For example, a first cellular transceiver 58 can operate in one mode, for example, GSM, and an Nth transceiver 60 can operate in a different mode, for example UMTS. While only two transceivers 58, 60 are illustrated, it should be appreciated that a plurality of transceivers can be included. The communications component 56 can also include a transceiver 62 for unlicensed communications using technology such as, for example, Wireless Fidelity (WI-FI), Worldwide Interoperability for Microwave Access (WI-MAX), BLUETOOTH, infrared, Infrared Data Association (IRDA), Near-Field Communications (NFC), radio frequency (RF), and the like. The communications component 56 can also facilitate communications reception from terrestrial radio networks, digital satellite radio networks, Internet-based radio services networks, combinations thereof, and the like. The communications component 56 can process data from a network such as, for example, the Internet, a corporate intranet, a home broadband network, and the like, via an internet service provider (ISP), digital subscriber line (DSL) provider, or other broadband provider.

An input/output (I/O) interface 64 can be provided for input/output of data and/or signals. The I/O interface 64 can be a hardwire connection, such as, for example, a USB, mini-USB, audio jack, PS2, IEEE 1394, serial, parallel, Ethernet (RJ48), RJ11, and the like, and can accept other I/O devices such as, for example, a keyboard, keypad, mouse, interface tether, stylus pen, printer, thumb drive, touch screen, touch pad, trackball, joy stick, microphones, remote control devices, monitor, display, LCD, combinations thereof, and the like. In some embodiments, the display 40 is integrated with a touch screen I/O interface 64. It will be appreciated that the I/O interface 64 can be used for communications between the device and a network or local device, instead of, or in addition to, the communications component 56.

Audio capabilities can be provided by an audio I/O component 66 that can include a speaker for the output of audio signals and a microphone to collect audio signals. The device 30 can include a slot interface 68 for accommodating a subscriber identity system 70 such as, for example, a SIM or universal SIM (USIM). The subscriber identity system 70 instead can be manufactured into the device 30, thereby obviating the need for a slot interface 68. The device 30 can include an image capture and processing system 72. Photos and/or videos can be obtained via an associated image capture subsystem of the image system 72, for example, a camera. The device 30 can also include a video system 74 for processing, recording, and/or transmitting video content.

A location component 76 can be included to send and/or receive signals such as, for example, GPS data, triangulation data, combinations thereof, and the like. The device 30 can use the received data to identify its location or can transmit data used by other devices to determine the device 30 location. The device 30 can include a power source 78 such as batteries and/or other power subsystem (AC or DC). The power source 78 can interface with an external power system or charging equipment via a power I/O component 80.

Figure 3:
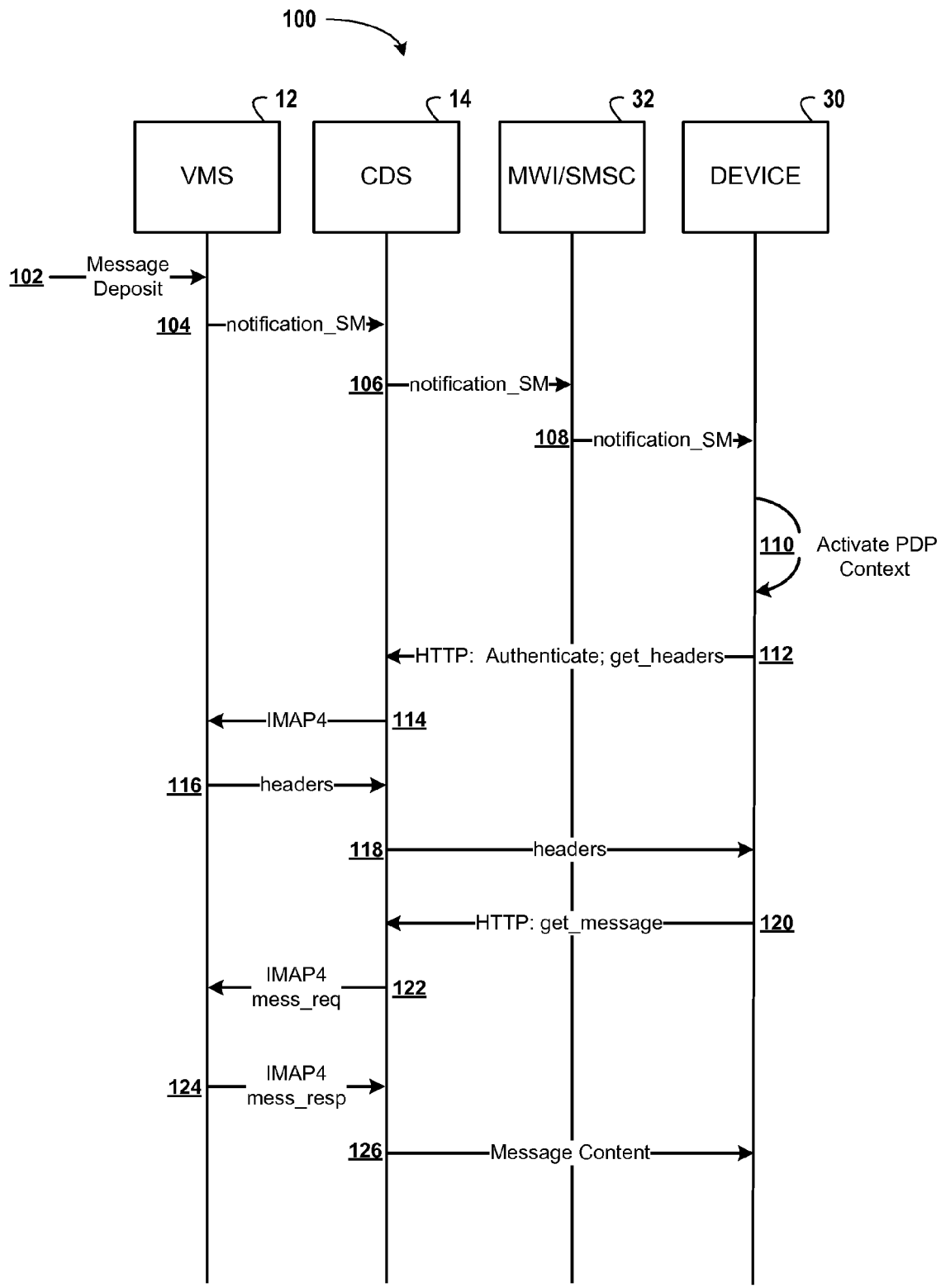
FIG. 3 is a call flow diagram illustrating an exemplary method for downloading a voicemail deposited at a voicemail system to a device, according to an exemplary embodiment of the present disclosure.

FIG. 3 is a call flow diagram illustrating an exemplary method 100 for downloading one or more voicemail messages deposited at a voicemail system to a device 30, according to an exemplary embodiment of the present disclosure. It should be understood that the steps described are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. The method 100 can be terminated at any time. Some or all steps of this process, and/or substantially equivalent steps, can be performed by execution of computer-readable instructions included on a computer readable medium.

In an attempt to simplify the description of the method 100, some steps, network elements, and/or nodes have been omitted from FIG. 3. Similarly, messages and data are described and illustrated in generic terms, though it will be appreciated that multiple message and data formats, as well as multiple message and data nodes, relays, and messaging platforms can be involved in any or all of the communications described herein.

In an additional attempt to simplify the description and to avoid complicating the disclosure, the following description will describe, in general terms, performance of various systems and methods embodying some concepts of various embodiments of the disclosure. In reading the description of the several embodiments disclosed herein, it should be understood that a user can interact with a voicemail system using a telephone user interface (TUI), a GUI, a web UI, or another UI. Alternatively, a user can interact with the device 30, and the device 30 can handle all communication needed to instruct the VMS 12 how to carry out the user's desired actions. It should be appreciated that some, many, or all of the functions of the VMS 12 can be automated and can therefore not require any interaction with the user or device 30. Therefore, DMTF-driven TUIs, icon-based GUIs, touch-sensitive screen GUIs, web UIs, voice-driven TUIs, and the like are included in the following descriptions of the exemplary method 100 disclosed herein and are included in the scope of the appended claims.

The illustrated method 100 begins with a message being deposited at the VMS 12, as illustrated by step 102. It will be appreciated that messages can be audio messages, video messages, text messages, and the like, and that a variety of methods and/or systems can be used to deposit messages at a VMS 12. In the illustrated embodiment, the VMS 12 notifies the CDS 14 that a message has been deposited, for example, by generating a SMPP notification message (notification_SM) that is sent to the CDS 14, as shown at step 104. A notification_SM message can include, but is not limited to, the hostname and port number for the subscriber's CDS 14, a token identifying the subscriber's VMS 12, the subscriber's voicemail box ID embedded with a token to uniquely identify the subscriber for the VMS 12, and the current VMS password. In some alternative embodiments, the notification_SM includes an IP address and port number for the subscriber's CDS 14 and a mailbox_ID. The password and token can be added to help increase security and to help preserve data integrity. If a password is used, the password can be encrypted or unencrypted, and/or the password can be obscured to hide the actual default password digits.

The CDS 14 can forward the notification_SM message, at step 106, to the SMSC 32 that, in turn, can forward the message, at step 108, to the device 30. In some embodiments, the receipt, by the device 30, of the notification_SM message will prompt the device 30 to activate a PDP context and to establish one or more data sessions to download messages. The data sessions can be, for example, packet data sessions conducted over a portion of a GPRS network. The establishment of a data session is illustrated at step 110. The device 30 can generate an HTTP get_headers command/message that is sent to the CDS 14, as illustrated at step 112. The get_headers message can include parameters such as the date, time, and calling line identity (CLI). The get_headers message can additionally include authentication information for IMAP sessions between the CDS 14 and VMS 12. Although the CDS 14 and the VMS 12 are illustrated as separate entities, the functions of both elements can be performed by one entity.

At step 114, the CDS 14 can initiate an IMAP session with the VMS 12. Accordingly, a TCP connection can be established and the get_headers message can be used to authenticate the session, after which the subscriber's voicemail box can be accessed on the VMS 12 to retrieve the header information for the voicemail messages. The VMS 12 can send the headers to the CDS 14, as illustrated at step 116. The CDS 14 can forward the headers to the device 30, as illustrated at step 118. The device 30 can use the headers to determine the status of each message stored on the device 30, and to identify any changes made at the VMS 12, for example, any deposited messages or changes to messages. After the device 30 determines which message(s) needs to be retrieved, the device 30 can generate and send a message request, for example, an HTTP get_message request with the header information for the requested message(s), as illustrated at step 120. At step 122, the get_message request can be received and the CDS 14 can generate and send an IMAP message_request (IMAP mess_req), including the requested voicemail message header information, to the VMS 12. The VMS 12 can process the request and return the requested message content in an IMAP message_response (IMAP mess_resp), as illustrated at step 124. The CDS 14 can deliver the designated message content to the device 30, as illustrated at step 126.

The device 30 can store received message content under the appropriate header in a memory, and can permit the subscriber to access the content via a user interface, for example, a GUI. The message content can be formatted using any audio CODEC, such as, but not limited to, adaptive multi-rate (AMR), AMR wideband (AMR-WB), or any other standardized or independent audio CODEC, including, but not limited to waveform audio (WAV), audio interchange file format (AIFF), RAW, encoded in GSM CODEC, advanced audio coding (AAC), MPEG-1 audio layer 3 (MP3), MPEG-4 Part 14 (MP4 or M4A), Windows® media audio (WMA), RealAudio (RA), free lossless audio codec (FLAC), Apple® lossless encoder (ALE), i.e., Apple® lossless audio codec (ALAC), and other open and proprietary audio formats.

Although not illustrated in FIG. 3, in certain embodiments, an "if-modified-since" HTTP Message can be used to occasionally poll the VMS 12 for the Inbox voicemail message list and update any voicemail message "if-modified-since" the last update, for example, if a message was deleted or added at the device 30 or the VMS 12. This can help reduce the amount of data traversing the network, thereby reducing network congestion. However, in some embodiments, the amount of data used to represent the header information is relatively small and as such no noticeable improvement may be available for sending only the modified voicemail message header(s).

In certain embodiments, more than one connection can be established to the VMS 12 or in some cases to multiple or redundant VMSs. This can allow simultaneous requests in order to serve a subscriber's request to view or listen to a message faster. In some other embodiments, messages are transferred to a device 30 upon receipt by the VMS 12 without any request being made by the device 30. Load balancing techniques can also be implemented. In certain embodiments, message downloads that are interrupted, for example, via cancellation or connection failure, can be restarted or resumed starting at the last received byte. In some embodiments, the message is stored in full, at least temporarily, on the CDS 14. However, in some embodiments, the CDS 14 deletes the message after the message content is sent to the device 30. A subsequent request for one or more previously sent messages, therefore, may be facilitated by re-retrieving the message, re-transcoding the message, and resending the message to the device 30. In certain embodiments, requests to the CDS 14 can be pipelined in accordance with HTTP 1.1 specifications. This can help reduce network latency for multiple requests.

Figure 4:
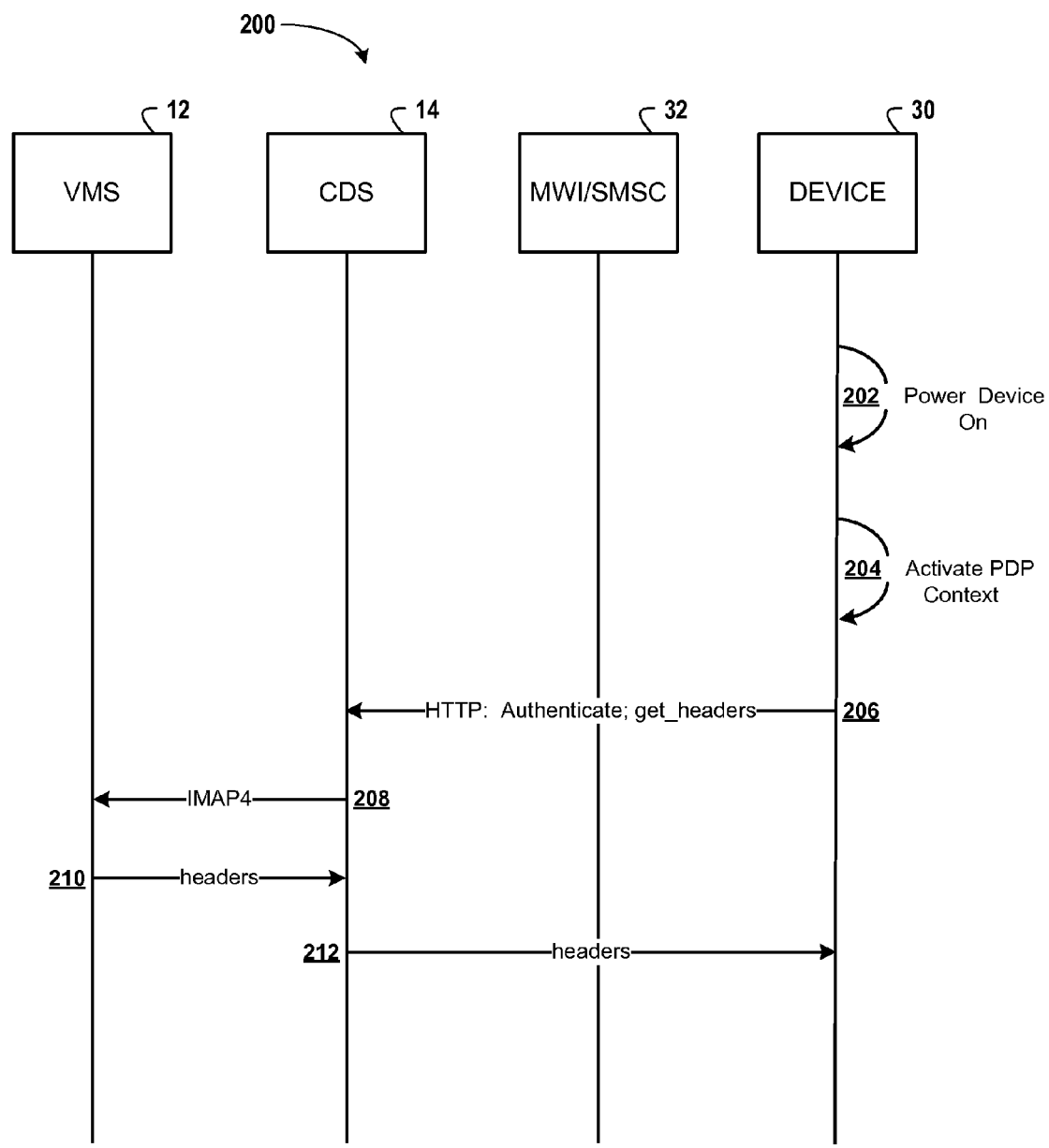
FIG. 4 is a call flow diagram illustrating an exemplary method for downloading one or more voicemails deposited at a voicemail system to a device, according to another exemplary embodiment of the present disclosure.

FIG. 4 is a call flow diagram illustrating an exemplary method 200 for retrieval of voicemail message content for local storage on a mobile device, according to an alternative exemplary embodiment of the present disclosure. It should be understood that the steps described are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. The method 200 can be terminated at any time. Some or all steps of this process, and/or substantially equivalent steps, can be performed by execution of computer-readable instructions included on a computer readable medium.

In an attempt to simplify the description of the method 200, some steps, network elements, and/or nodes have been omitted from FIG. 4. Similarly, messages and data are described and illustrated in generic terms, though it will be appreciated that multiple message and data formats, as well as multiple message and data nodes, relays, and messaging platforms can be involved in any or all of the communications described herein.

The method 200 begins with the device 30 being powered on, as illustrated at step 202. Prior to the device 30 powering on, one or more messages can be, but are not necessarily, deposited at the VMS 12, though message deposit is not illustrated in FIG. 4. As explained above, the VMS 12 can prompt delivery of a message waiting indicator to the device 30. In some embodiments, whether or not the device 30 receives the message waiting indicators, for example, one or more short messages, the device 30 can be configured to automatically activate a PDP context after the device 30 is powered on and registered with the network 10, as illustrated at step 204. As such, it will be appreciated that the network 10 can be configured to discard message waiting indicators when it recognizes that the device 30 is not registered with the network.

In other embodiments, the device 30 is not configured to automatically activate a PDP context after the device 30 is powered on and registered with the network 10. Instead, the activation of the PDP context illustrated in step 204 can occur when the user selects an option that initiates updating of the voicemail data. In some embodiments, updating voicemail data occurs when the user starts the voicemail application. In other embodiments, updating voicemail data occurs when the user selects an option to synchronize voicemail data. In still other embodiments, the user is presented with a notification of new messages, and the user selects an option to download the messages.

Regardless of what prompts the device 30 to activate the PDP context illustrated in step 204, it should be appreciated that the activation of a PDP context can be substantially similar to the activation of a PDP context illustrated at step 110 of FIG. 3. Once the device 30 has established a data session over the communications network 10, the device 30 can generate an HTTP get_headers command/message that is sent to the CDS 14, as illustrated at step 206, and as explained above with reference to step 112 of FIG. 3. The get_headers message can include parameters such as the date, time, and calling line identity (CLI). The get_headers message can additionally include authentication information for IMAP sessions between the CDS 14 and VMS 12.

At step 208, the CDS 14 can initiate an IMAP session with the VMS 12, as explained above with reference to step 114 of FIG. 3. Accordingly, a TCP connection can be established and the get_headers message can be used to authenticate the session, after which the subscriber's voicemail box can be accessed on the VMS 12 to retrieve the header information for the voicemail messages. The VMS 12 can send the headers to the CDS 14, as illustrated at step 210, and as explained above with reference to step 116 of FIG. 3. The CDS 14 can forward the headers to the device 30, as illustrated at step 212, and as explained above with reference to step 118 of FIG. 3. The device 30 can use the headers to determine the status of each message stored on the device 30, and to identify any changes made at the VMS 12, for example, any deposited messages or changes to messages. The method 200 can proceed, if desired, with message download, as explained above in FIG. 3. After message download, or before message download if there are no new messages at the VMS 12, the method 200 can end.

Figure 5:
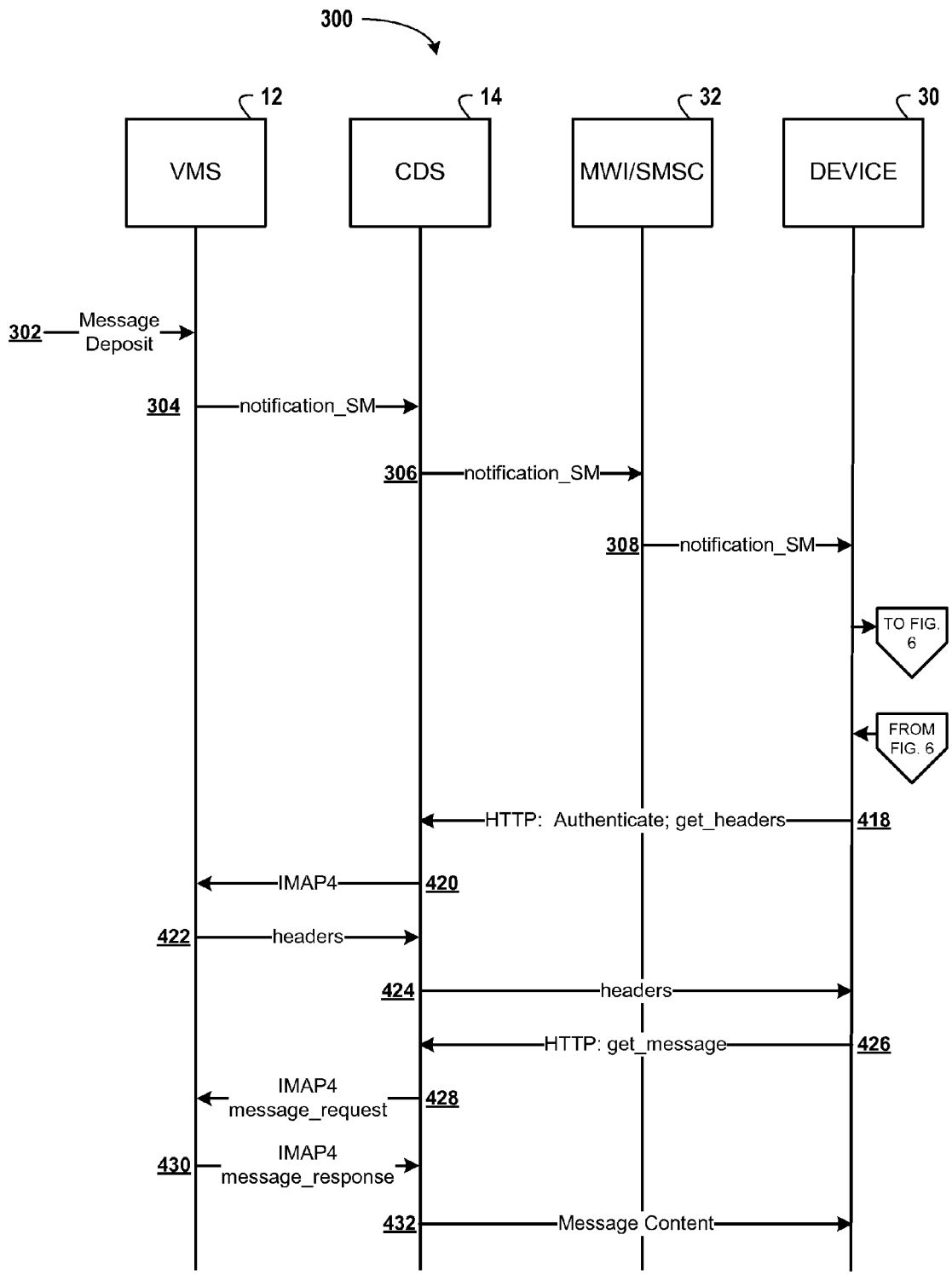
FIG. 5 is a call flow diagram illustrating a portion of a method for downloading one or more voicemails deposited at a voicemail system to a device, according to an alternative exemplary embodiment of the present disclosure.

FIG. 5 is a call flow diagram illustrating another exemplary method 300 for voicemail message deposit and subsequent retrieval of message content for local storage on a mobile device, according to some alternative exemplary embodiments of the present disclosure. It should be understood that the steps described are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. The method 300 can be terminated at any time. Some or all steps of this process, and/or substantially equivalent steps, can be performed by execution of computer-readable instructions included on a computer readable medium.

In an attempt to simplify the description of the method 300, some steps, network elements, and/or nodes have been omitted from FIG. 5. Similarly, messages and data are described and illustrated in generic terms, though it will be appreciated that multiple message and data formats, as well as multiple message and data nodes, relays, and messaging platforms can be involved in any or all of the communications described herein.

The method 300 begins with a message being deposited at the VMS 12, as illustrated by step 302. When some embodiments of the illustrated method 300 begin, the device 30 is powered on and operating on a communications network 10. It will be appreciated that messages can be audio messages, video messages, text messages, and the like, and that a variety of methods and/or systems can be used to deposit messages at a VMS 12. In the illustrated embodiment, the VMS 12 notifies the CDS 14 that a message has been deposited, for example, by generating a SMPP notification message (notification_SM) that is sent to the CDS 14, as shown at step 304. A notification_SM message can include, but is not limited to, the hostname and port number for the subscriber's CDS 14, a token identifying the subscriber's VMS 12, the subscriber's voicemail box ID embedded with a token to uniquely identify the subscriber for the VMS 12, and the current VMS password. In some alternative embodiments, the notification_SM includes an IP address and port number for the subscriber's CDS 14 and a mailbox_ID. The password and token can be added to help increase security and to help preserve data integrity. If a password is used, the password can be encrypted or unencrypted, and/or the password can be obscured to hide the actual default password digits.

The CDS 14 can forward the notification_SM message, at step 306, to the SMSC 32 that, in turn, can forward the message, at step 308, to the device 30. In the embodiment illustrated in FIG. 5, the device 30 receives the notification_SM message. The device 30 can execute the submethod 400 illustrated in FIG. 6.

Figure 6:
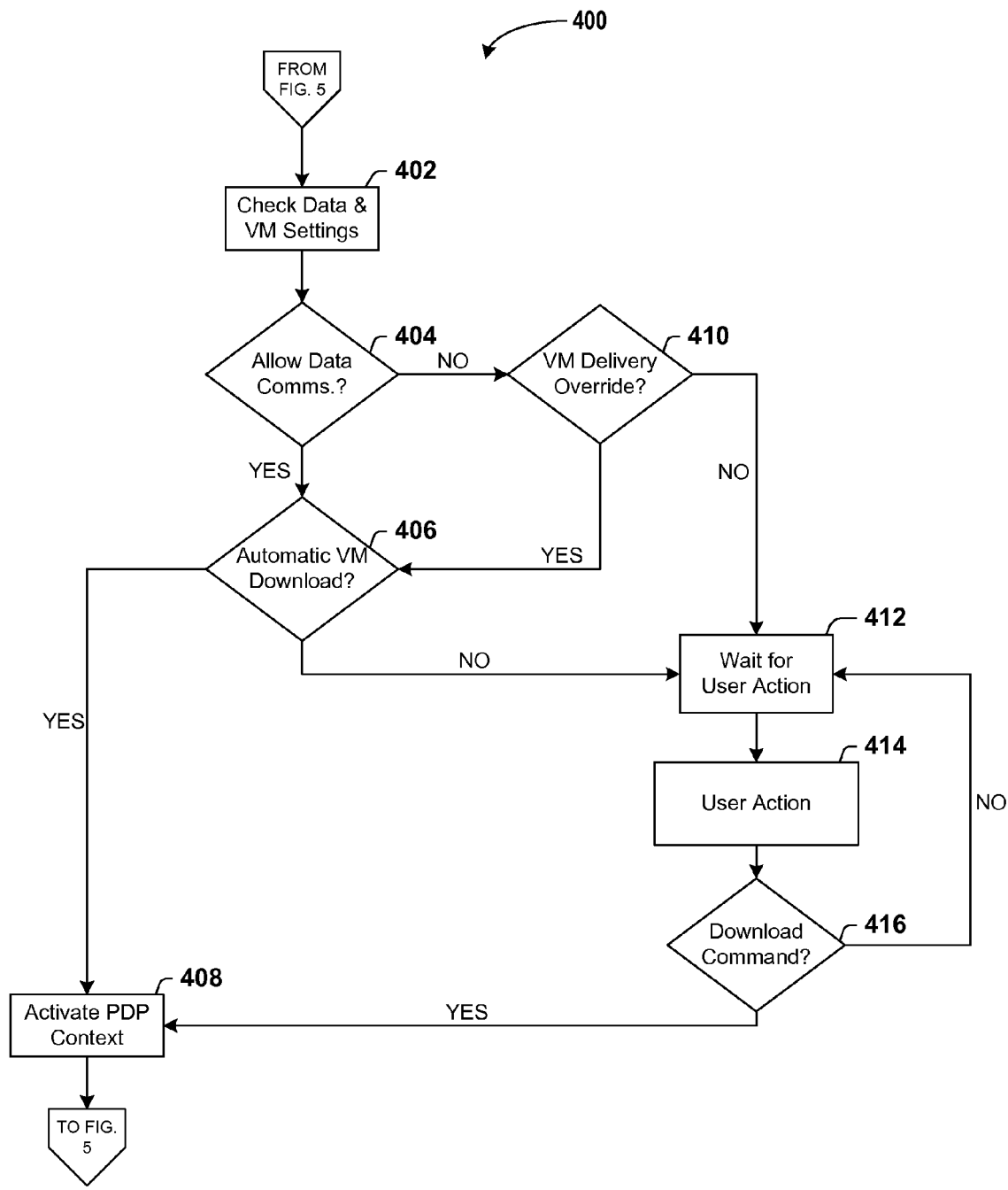
FIG. 6 schematically illustrates a submethod for determining how a device interfaces with a voicemail system, according to an exemplary embodiment of the present disclosure.

Referring now to FIG. 6, a submethod 400 for determining what to do after receiving a notification_SM message is illustrated according to an exemplary embodiment of the present disclosure. As illustrated at block 402, the device 30 can check the device 30 settings to determine how the device 30 is configured to handle data and voicemail content. Proceeding to block 404, the data communications settings are reviewed. If the device 30 is configured to allow data communications, the submethod 400 can proceed to block 406, whereat the device 30 determines if the device 30 is configured to automatically download voicemail messages upon deposit of a message at the VMS 12. If the device 30 determines that the device 30 is configured to automatically download deposited messages, the device 30 can be configured to activate a PDP context and to establish a data session, as illustrated at block 408. It should be appreciated that the activation of a PDP context and establishment of a data session illustrated at step 408 can be substantially similar to the activation of a PDP context and establishment of a data session illustrated at step 110 of FIG. 3, and step 204 of FIG. 4. The submethod 400 can end and the method 300 can continue.

Returning now to block 404 of FIG. 6, if the device 30 is not configured to allow data communications, the submethod 400 can proceed to block 410, whereat the device 30 can determine if an option to override the data communications setting is turned on or off. If the device 30 is configured to override the data communications selection, then the submethod 400 can proceed to block 406. As mentioned above, the device 30 can determine, at block 406, whether the device 30 is configured for automatic download of the voicemail messages upon deposit of a message at the VMS 12. If the device 30 is configured for automatic download of voicemail messages, then the submethod 400 can proceed as described above, to block 408. If the device 30 is not configured for automatic download of the voicemail messages, then the method can proceed to block 412, whereat the device 30 can wait for a user action that directs the device 30 to connect to the VMS 12. Returning briefly to block 410, if the device 30 is not configured to override the data communications selection, then the submethod 400 can proceed to block 412. As such, the submethod 400 can proceed to block 412 from block 406 or 410.

At block 412, the device 30 can wait for a user action, for example, a user command. At block 414, the device 30 can detect a user action, for example, entry of a command by the user, activation of a voicemail application, or the like. At block 416, the device 30 can determine if the user action was a command for the device 30 to download the voicemail messages or another action that is configured to trigger download of voicemail messages. If the user action was a command for the device 30 to download the voicemail messages, or another command that triggers the download of voicemail messages, then the submethod 400 can proceed to block 408, as described above. If the user action was not a command for the device 30 to download the voicemail messages, then the submethod 400 can return to block 412, whereat the device 30 waits for another user action.

It should be understood that the term "wait" as used with reference to submethod 400 is not meant to imply that the device 30 is idle until a user action is received. Instead, the submethod 400 is idle until a user action is received. As such, the device 30 can handle a variety of actions, including receipt of additional notification_SM messages while the submethod 400 is "waiting" for a user action that directs the device 30 to download the voicemail messages. Once a user action directing the device 30 to download the voicemail messages is received, the submethod 400 can proceed to block 408, the device 30 can activate a PDP context, the submethod 400 can end, and the method 300 can continue.

Returning now to FIG. 5, the method 300 can continue with step 418, wherein the device 30 can generate an HTTP get_headers message that is sent to the CDS 14. The get_headers message can include parameters such as the date, time, and calling line identity (CLI). The get_headers message can additionally include authentication information for IMAP sessions between the CDS 14 and VMS 12.

At step 420, the CDS 14 can initiate an IMAP session with the VMS 12. Accordingly, a TCP connection can be established and the get_headers message can be used to authenticate the session, after which the subscriber's voicemail box can be accessed on the VMS 12 to retrieve the header information for the voicemail messages. The VMS 12 can send the headers to the CDS 14, as illustrated at step 422. The CDS 14 can forward the headers to the device 30, as illustrated at step 424. The device 30 can use the headers to determine the status of each message stored on the device 30, and to identify any changes made at the VMS 12, for example, any deposited messages or changes to messages. The device 30 can generate and send a message request, for example, an HTTP get_message request with the header information for the requested message(s), as illustrated at step 426. At step 428, the get_message message can be received and the CDS 14 can generate and send an IMAP message_request, including the requested voicemail message header information, to the VMS 12. The VMS 12 can process the request and return the requested message content in an IMAP message_response, as illustrated at step 430. The CDS 14 can deliver the designated message content to the device 30, as illustrated at step 432. The method 300 can end.

Figure 7:
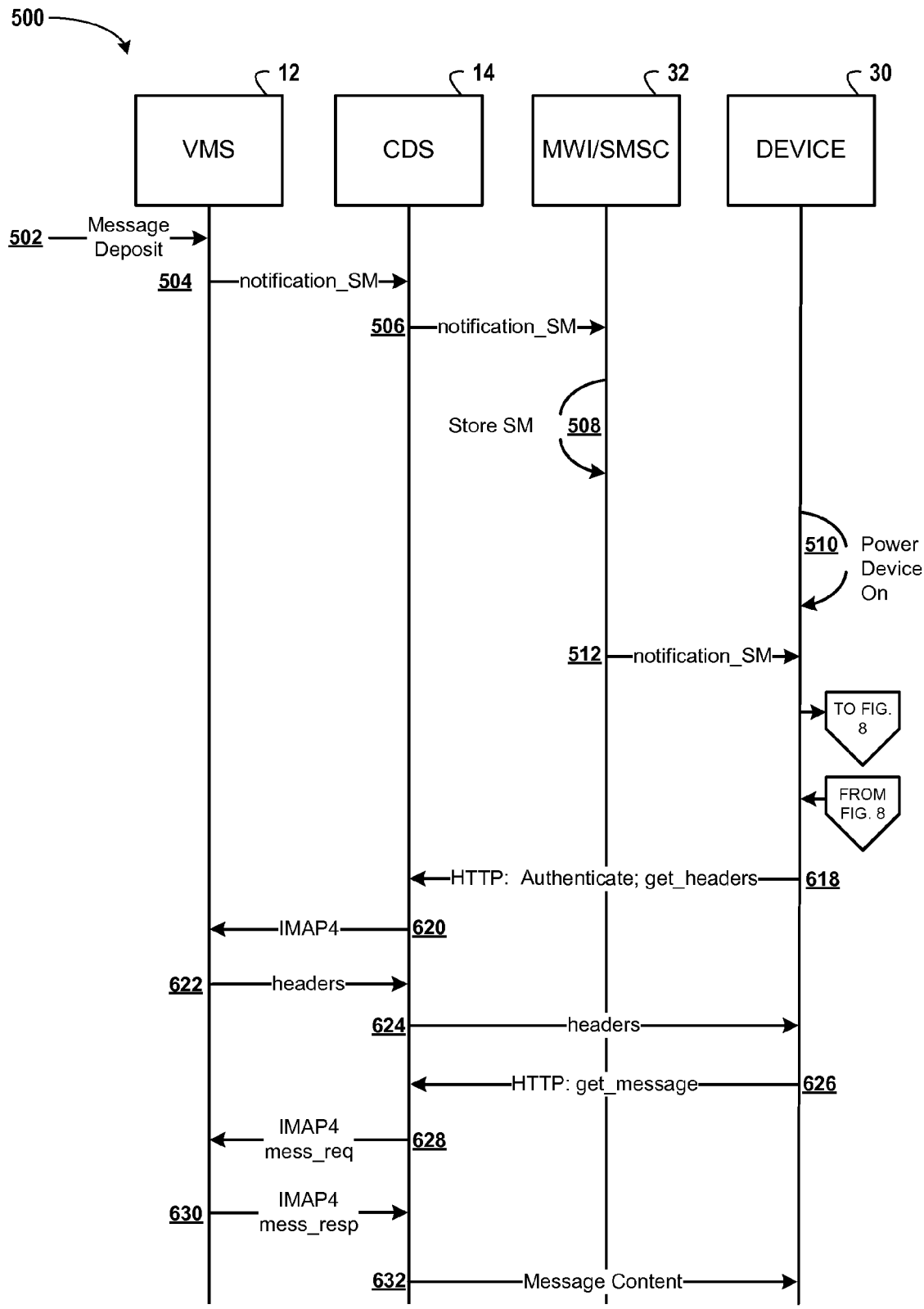
FIG. 7 is a call flow diagram illustrating a portion of a method for downloading one or more voicemails deposited at a voicemail system to a device, according to another alternative exemplary embodiment of the present disclosure.

FIG. 7 is a call flow diagram illustrating another exemplary method 500 for voicemail message deposit and subsequent retrieval of message content for local storage on a mobile device, according to some alternative exemplary embodiments of the present disclosure. It should be understood that the steps described are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. The method 500 can be terminated at any time. Some or all steps of this process, and/or substantially equivalent steps, can be performed by execution of computer-readable instructions included on a computer readable medium.

In an attempt to simplify the description of the method 500, some steps, network elements, and/or nodes have been omitted from FIG. 7. Similarly, messages and data are described and illustrated in generic terms, though it will be appreciated that multiple message and data formats, as well as multiple message and data nodes, relays, and messaging platforms can be involved in any or all of the communications described herein.

When the illustrated method 500 begins, the device 30 is powered off. The method 500 begins with a message being deposited at the VMS 12, as illustrated by step 502. It will be appreciated that messages can be audio messages, video messages, text messages, and the like, and that a variety of methods and/or systems can be used to deposit messages at a VMS 12. In the illustrated embodiment, the VMS 12 notifies the CDS 14 that a message has been deposited, for example, by generating a SMPP notification message (notification_SM) that is sent to the CDS 14, as shown at step 504. A notification_SM message can include, but is not limited to, the hostname and port number for the subscriber's CDS 14, a token identifying the subscriber's VMS 12, the subscriber's voicemail box ID embedded with a token to uniquely identify the subscriber for the VMS 12, and the current VMS password. In some alternative embodiments, the notification_SM includes an IP address and port number for the subscriber's CDS 14 and a mailbox_ID. The password and token can be added to help increase security and to help preserve data integrity. If a password is used, the password can be encrypted or unencrypted, and/or the password can be obscured to hide the actual default password digits.

The CDS 14 can forward the notification_SM message, at step 506, to the SMSC 32. The SMSC 32 can be configured as a store and forward messaging platform that can store the message until the device 30 is ready to receive the message. In the illustrated embodiment, the device 30 is turned off (powered down) when the SMSC 32 receives the notification_SM message in step 506. Although the method 500 is illustrated as if the device 30 is powered down at step 506, it should be appreciated that the device 30 could be out of range, roaming on a network that does not support messaging, conducting a communication that interferes with reception of a message, or otherwise unable to accept messages.

Regardless of the reason for the device 30 being unable to receive messages, the SMSC 32 can store the message, as illustrated at step 508, and can wait for the device 30 to become available. At some time, the device 30 is powered on, as illustrated at step 510. The device 30 can be configured not to activate a PDP context when the device 30 is powered on. The device 30 can register with the network 10 and the SMSC 32 can be notified that the device 30 has registered with the network 10. The SMSC 32 forwards the notification_SM message to the device 30, as illustrated at step 512. The device 30 can be configured not to connect to the VMS 12 upon receipt of the notification_SM. In the illustrated method 500, the device 30 executes the submethod 600 illustrated in FIG. 8 when the notification_SM is received.

Figure 8:
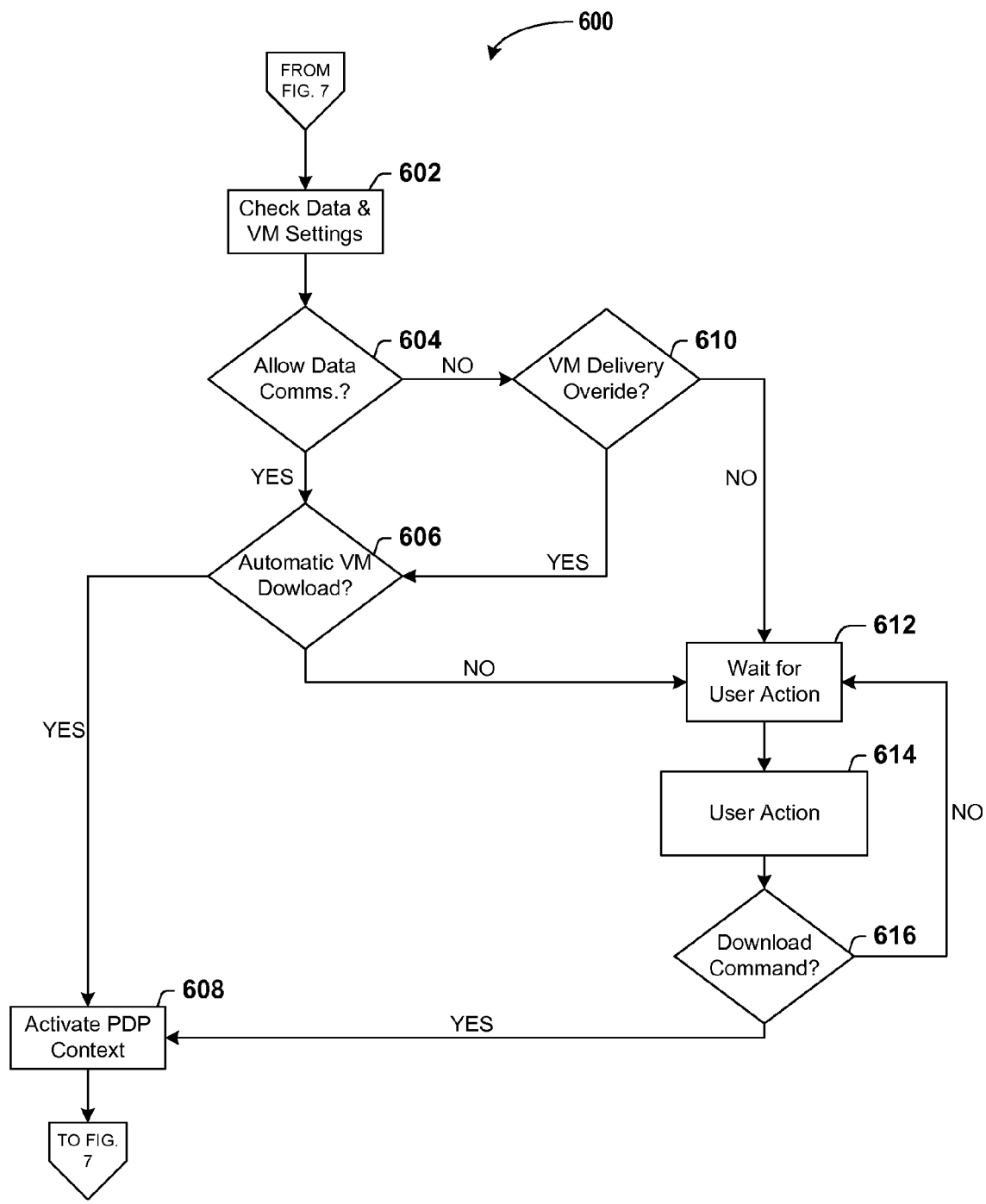
FIG. 8 schematically illustrates a submethod for determining how a device interfaces with a voicemail system, according to an alternative exemplary embodiment of the present disclosure.

Referring now to FIG. 8, a submethod 600 for determining how to handle a notification_SM message is illustrated according to an exemplary embodiment of the present disclosure. It will be appreciated that the submethod 600 can be substantially similar to the method 400 illustrated in FIG. 6. As illustrated at block 602, the device 30 can check the device 30 settings to determine how the device 30 is configured to handle data and voicemail content. Proceeding to block 604, the data communications settings are reviewed. If the device 30 is configured to allow data communications, the submethod 600 can proceed to block 606, whereat the device 30 determines if the device 30 is configured to automatically download voicemail messages upon deposit of a message at the VMS 12. If the device 30 determines that the device 30 is configured to automatically download deposited messages, the device 30 can be configured to activate a PDP context, as illustrated at block 608. It should be appreciated that the activation of a PDP context as illustrated at step 608 can be substantially similar to the activation of a PDP context illustrated at step 110 of FIG. 3, and step 204 of FIG. 4. The submethod 600 can end and the method 500 can continue.

Returning now to block 604 of FIG. 8, if the device 30 is not configured to allow data communications, the submethod 600 can proceed to block 610, whereat the device 30 can determine if an option to override the data communications setting is turned on or off. If the device 30 is configured to override the data communications selection, then the submethod 600 can proceed to block 606. As mentioned above, the device 30 can determine, at block 606, whether the device 30 is configured for automatic download of the voicemail messages upon deposit of a message at the VMS 12. If the device 30 is configured for automatic download of voicemail messages, then the submethod 600 can proceed as described above, to block 608. If the device 30 is not configured for automatic download of the voicemail messages, then the method can proceed to block 612, whereat the device 30 can wait for a user action that directs the device 30 to connect to the VMS 12. Returning briefly to block 610, if the device 30 is not configured to override the data communications selection, then the submethod 600 can proceed to block 612. As such, the submethod 600 can proceed to block 612 from block 606 or 610.

At block 612, the device 30 can wait for a user action, for example, a user command. At block 614, the device 30 can detect a user action, for example, entry of a command by the user, activation of the voicemail application, or the like. At block 616, the device 30 can determine if the user action was a command for the device 30 to download the voicemail messages or another action that is configured to trigger download of voicemail messages. If the user action was a command for the device 30 to download the voicemail messages, or another command that triggers the download of voicemail messages, then the submethod 600 can proceed to block 608, as described above. If the user action was not a command for the device 30 to download the voicemail messages, then the submethod 600 can return to block 612, whereat the device 30 waits for another user action.

It should be understood that the term "wait" as used with reference to submethod 600 is not meant to imply that the device 30 is idle until a user action is received. Instead, the submethod 600 is idle until a user action is received. As such, the device 30 can handle a variety of actions, including receipt of additional notification_SM messages while the submethod 600 is "waiting" for a user action that directs the device 30 to download the voicemail messages. Once a user action directing the device 30 to download the voicemail messages is received, the submethod 600 can proceed to block 608, the device 30 can activate a PDP context, the submethod 600 can end, and the method 500 can continue.

Returning now to FIG. 7, the method 500 can resume with step 618, wherein the device 30 can generate an HTTP get_headers command/message that is sent to the CDS 14. The get_headers message can include parameters such as the date, time, and calling line identity (CLI). The get_headers message can additionally include authentication information for IMAP sessions between the CDS 14 and VMS 12.

At step 620, the CDS 14 can initiate an IMAP session with the VMS 12. Accordingly, a TCP connection can be established and the get_headers message can be used to authenticate the session, after which the subscriber's voicemail box can be accessed on the VMS 12 to retrieve the header information for the voicemail messages. The VMS 12 can send the headers to the CDS 14, as illustrated at step 622. The CDS 14 can forward the headers to the device 30, as illustrated at step 624. The device 30 can use the headers to determine the status of each message stored on the device 30, and to identify any changes made at the VMS 12, for example, any deposited messages or changes to messages. The device 30 can generate and send a message request, for example, an HTTP get_message request with the header information for the requested message(s), as illustrated at step 626. At step 628, the get_message message can be received and the CDS 14 can generate and send an IMAP message_request, including the requested voicemail message header information, to the VMS 12. The VMS 12 can process the request and return the requested message content in an IMAP message_response, as illustrated at step 630. The CDS 14 can deliver the designated message content to the device 30, as illustrated at step 632. The method 500 can end.

Figure 9:
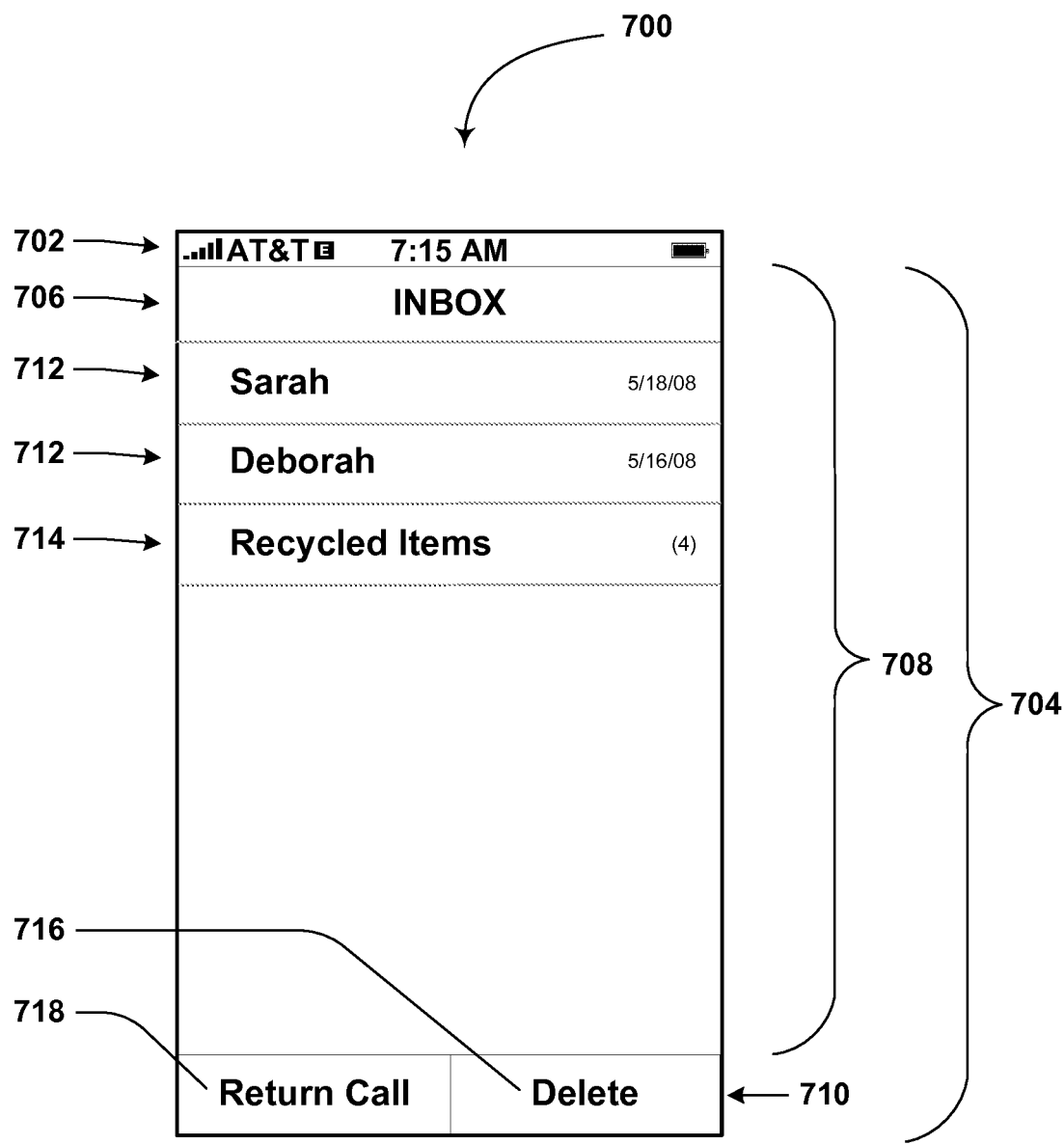
FIG. 9 illustrates an exemplary graphical user interface (GUI) for a visual voicemail client, according to an exemplary embodiment of the present disclosure.
Figure 10:
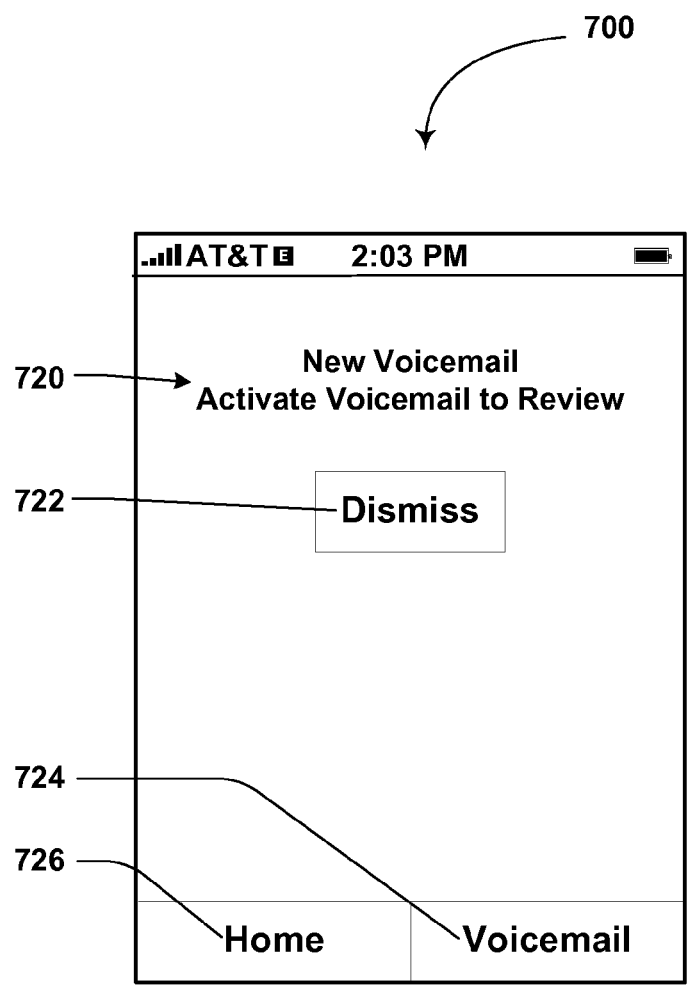
FIG. 10 illustrates an exemplary GUI for providing a message waiting indicator (MWI) to a user, according to an exemplary embodiment of the present disclosure.
Figure 11:
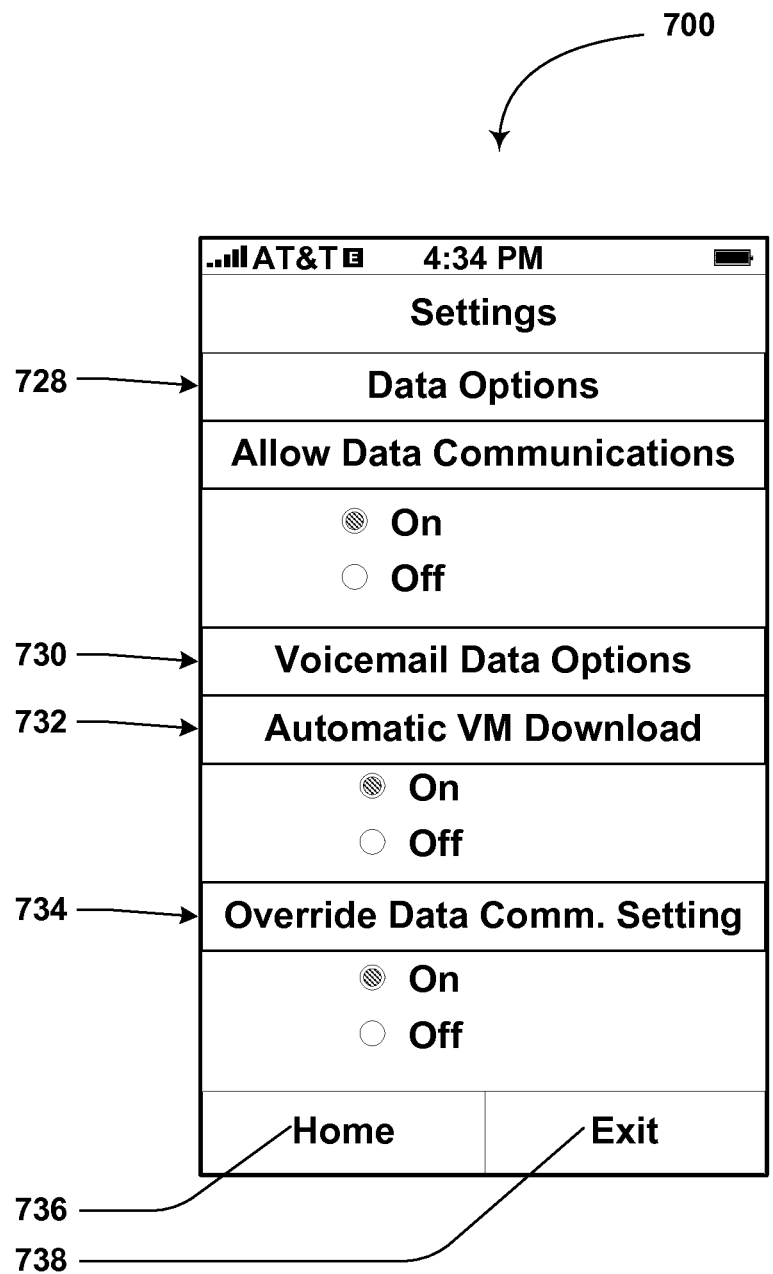
FIG. 11 illustrates an exemplary GUI for configuring exemplary voicemail and data settings, according to an exemplary embodiment of the present disclosure.

FIG. 9 illustrates an exemplary representative image from a GUI 700 displayed, for example, on a display 40 of a device 30 or a web UI, according to an exemplary embodiment of the disclosure. It should be understood that the illustrated GUI 700, the overall appearance, look, and/or feel thereof, the options represented therein, the text and/or text font of the options, and the controls presented, the types of controls presented, are exemplary only, and represent only one contemplated exemplary embodiment. As has been explained above, one or more voicemail systems 12 can be configured and/or controlled with a variety of UIs, including, but not limited to, a GUI 700 on a device 30. As such, the GUI 700 illustrated in FIGS. 9-11 is a general illustration of one embodiment of a UI, illustrated solely for the purpose of explaining how a user or the device 30 can modify and/or control the one or more voicemail systems 12 and/or how the device 30 interfaces with the one or more voicemail systems 12.

Additionally, the illustrated GUI 700 should not be understood as a limiting embodiment. It must therefore be understood that various menu options, settings, passwords, and the like, can be controlled and/or tailored by interfacing with one or more VMSs 12 through a TUI, a GUI, a Web UI, a network operator, and the like. In the illustrated embodiment, an exemplary visual voicemail client UI is used to interface with the VMS 12, and the user can access various settings and/or menus to determine how the device 30 interfaces with the VMSs 12.

As illustrated, the GUI 700 can include an operational display 702 to display various data for the user. The operational display 702 can display operational information, such as, but not limited to, network information. Operational information can include, but is not limited to, a signal meter for displaying the measured strength of a network signal and a network indicator for displaying the current network to which the device 30 is connected. In the illustrated GUI 700, the device 30 is indicating a maximum signal strength and that the device 30 is currently connected to the AT&T EDGE (Enhanced Data rates for GSM Evolution) network. It should be understood that this indication is exemplary only since the GUI 700 can be used on devices operating on other networks and operated by other carriers. The exemplary GUI 700 can display any desired information, including, but not limited to, the time of day, battery meter, short range radio communications device indicators, alarm indicators, dates, the user's name, as well as other indicators, and the like.

The illustrated GUI 700 is currently displaying an exemplary visual voicemail application user interface (VVMAUI) 704. The illustrated VVMAUI 704 includes a title portion 706, a mailbox contents portion 708, and a control/menu portion 710. The mailbox contents portion 708 can display one or more messages 712. The mailbox contents portion 708 can also display folders, directories, and the like, for example, a folder for deleted messages, illustrated as a "Recycled Items" folder 714. The control/menu portion 710 can include one or more controls, if desired. The illustrated control/menu portion 710 includes an option 716 to delete a selected message and an option 718 to initiate a call to the calling party who left the selected message. Additional options, menus, functions, and the like can be displayed, but are not illustrated in FIG. 9.

In some embodiments, the GUI 700 is controlled by using buttons, soft-buttons, joysticks, switches, wheels, or the like on a device keypad. In other embodiments, the device 30 or the VMS 12 is controlled through the GUI 700 using an input/output device operatively connected to the device 30. In other embodiments, the display 40 that displays the GUI 700 also functions as a touch-sensitive input device for accepting user input, whereby a user can touch the display 40 at the approximate location corresponding to a desired option to enter a command corresponding to the selected option. In still other embodiments, a combination of input devices are used to make desired selections. These and other embodiments are included in the scope of the appended claims.

As illustrated, some or all of the messages 712 can be displayed with information that identifies the calling party who left the message 712, the date the message was left, and the like. Other information can be displayed, for example, the voicemail system at which the message was left, or was intended to be left, type of message content, call data, the associated voicemail system, message length, message size, priority level, and the like. In operation, a user can select a message 712, and the device 30 can play, display, or both, the message for the user. The information displayed can be derived from the message content, from the message headers, or the like. It should be appreciated that the message content can be stored on the device 30, as explained above. Additionally, or alternatively, upon selection of a message 712, the device 30 can direct the VMS 12 to stream the message content to the device 30 upon selection of the desired message 712. It should be understood that the illustrated GUI 700, the options represented therein, the text of the options, and the controls presented, are exemplary only, and represent only one contemplated exemplary embodiment.

FIG. 10 illustrates another exemplary representative image from a GUI 700 for a device 30, according to an exemplary embodiment of the disclosure. It should be understood that the illustrated GUI 700, the overall appearance, look, and/or feel thereof, the options represented therein, the text and/or text font of the options, and the controls presented, the types of controls presented, are exemplary only, and represent only one contemplated exemplary embodiment.

The illustrated GUI 700 can be used to execute the steps described in, for example, blocks 412 and/or 612 of the exemplary submethods 400 and/or 600 illustrated in FIGS. 6 and 8, respectively. For example, in step 412 of the submethod 400 illustrated in FIG. 6, the device 30 has received a notification_SM message from the SMSC 32 and the device 30 not configured for automatic download of voicemail message content. As such, the device 30 has displayed a notification 720 informing the user that one or more new messages have been deposited at the VMS 12, but is waiting for the user to enter a command directing the device 30 to synchronize with the VMS 12. The exemplary GUI 700 includes an option 722 to dismiss the notification 720. Additionally, the illustrated GUI 700 includes an option 724 to start the voicemail client and an option 726 to go to a home screen, for example. Selection of the option 724 can start the voicemail client and/or start downloading messages, if desired. It should be understood that the illustrated GUI 700, the options represented therein, the text of the options, and the controls presented, are exemplary only, and represent only one contemplated exemplary embodiment.

FIG. 11 illustrates another exemplary representative image from a GUI 700 for a device 30, according to an exemplary embodiment of the disclosure. The GUI 700 is displaying an exemplary menu for setting and/or modifying settings for how the device 30 interfaces with the VMS 12 and the communications network 10, for example. It should be understood that the illustrated GUI 700, the overall appearance, look, and/or feel thereof, the options represented therein, the text and/or text font of the options, and the controls presented, the types of controls presented, are exemplary only, and represent only one contemplated exemplary embodiment.

The illustrated GUI 700 includes a menu 728 for allowing a user to toggle on/off the ability of the device 30 to connect to a data portion of a communications network 10. As such, a user can determine whether or not to allow the device 30 to allow data communications, for example, whether or not the device can activate a PDP context and establish a data session to download voicemail message data. A user may wish to disallow data communications in certain circumstances, for example, when the user travels out the user's regular network, when a data plan is nearly depleted, when loaning the phone to a family member or friend, and the like. While traveling outside of the user's regular network, for example, the user may wish to limit roaming data for purposes of avoiding the possible high costs associated with roaming data in certain circumstances.

The illustrated GUI 700 also includes an exemplary voicemail data options menu 730 for setting and/or modifying how the device 30 and/or the VMS 12 handle voicemail messages. The illustrated voicemail options menu 730 includes an automatic VM download menu 732 through which the user can toggle on/off whether the device 30 downloads messages automatically upon receiving notifications that new messages are waiting. The illustrated voicemail options menu 730 also includes an override data communications setting option 734 through which the user can toggle on/off an option to override the data setting of the data options menu 728. For example, if the user has toggled off the allow data communications option 728 and the automatic VM download option 732, the device 30 will recognize a conflict in the settings selected by the user. To resolve this conflict, the device 30 can examine the override data setting option 734, which, if toggled on, can allow the device 30 to download voicemail message content though other data functions of the device 30 are disabled. These options, and resolution of a possible exemplary conflict, are described above with reference to the steps 404, 406, 410 and 604, 606, 610 of the submethods 400 and 600 illustrated in FIGS. 6 and 8, respectively. Although additional settings are not illustrated in FIG. 7, it should be appreciated that other options are possible.

The illustrated GUI 700 also includes two exemplary menu options, an option 736 to go to a home screen and an option 738 to exit the settings menu. Additional or alternative menus and/or menu options are possible and contemplated, for example, options and/or menus for controlling or modifying settings relating to voicemail functionality including translation, forwarding, speech to text, text to speech, video messaging, conversion, archival, an option to provide more message waiting options, and the like.

While the preceding description has described voicemail messages primarily in the context of audio messages, it should be appreciated that the one or more VMSs 12 and/or one or more devices 30 can also process, store, transfer, download, forward, and consolidate (handle) text and/or video messages, if desired. In the event that the one or more VMSs 12 and/or the one or more devices 30 are configured to handle text and/or video messages, many of the same processes described above with respect to audio messages can be used to handle the messages.

It must be understood that the illustrated GUIs 700 are exemplary only and other contemplated user interfaces, screen layouts, selection methods, and the like are contemplated, including an embodiment of the VMS 12 that does not provide and/or interface with a GUI at the user's device 30. Furthermore, a selection can be made using various embodiments of softkeys and/or key selections on a mobile or stationary telephone keypad, for example, and is not limited to the illustrated GUIs 700. Additional and/or alternative selector switches and joysticks can be used to select a desired option or icon corresponding to a desired option. Input methods can also include touch screens or voice commands. Any desired screen layout or format can be used, including plain text and icons, for example.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

We claim:

1. A non-transitory computer readable medium having stored thereon computer executable instructions that, when executed by a processor, cause the processor to perform operations comprising:

receiving, at a device executing a voicemail application, a notification that voicemail data has been deposited at a voicemail system;

in response to the receiving, determining that a device setting of the device disallows data communications;

overriding the device setting that disallows the data communications;

in response to the overriding, establishing a data session with the voicemail system to transfer the voicemail data to the device;

obtaining the voicemail data;

updating data stored at the device with the voicemail data received; and presenting a user interface to control the voicemail application, the user interface comprising a control that specifies that the device is to override the device setting that disallows the data communications to download the voicemail data.

2. The non-transitory computer readable medium of claim 1, wherein the computer executable instructions, when executed by the processor, cause the processor to perform operations further comprising:

presenting a further user interface comprising a message waiting indication, a further indication that the device setting disallows the data communications, and an option to override the device setting that disallows the data communications.

3. The non-transitory computer readable medium of claim 1, wherein the computer executable instructions, when executed by the processor, cause the processor to perform operations further comprising:

presenting a further user interface comprising a visual voicemail inbox having a control to access the voicemail data obtained from the voicemail system.

4. The non-transitory computer readable medium of claim 3, wherein the computer executable instructions, when executed by the processor, cause the processor to perform operations further comprising:

authenticating with the voicemail system;

obtaining headers from the voicemail system; and in response to detecting a selection of the control, requesting a message from the voicemail system, and obtaining the message.

5. The non-transitory computer readable medium of claim 1, wherein the device comprises a smartphone, and wherein the voicemail system comprises a visual voicemail system.

6. A method comprising:

receiving, at a device executing a voicemail application, a notification that voicemail data has been deposited at a voicemail system associated with the device;

in response to the receiving, determining that a device setting of the device disallows data communications and that a further device setting specifies that the device is not to override the device setting;

presenting, at the device, a user interface comprising a message waiting indication and a further indication that the device setting disallows the data communications;

presenting, at the device, a further user interface to control the voicemail application, wherein the further user interface comprises a control to specify that the device is to override the device setting that disallows the data communications to download the voicemail data;

receiving a selection of the control;

overriding the device setting that disallows the data communications;

in response to the overriding, establishing a data session with the voicemail system to transfer the voicemail data to the device;

obtaining, at the device, the voicemail data; and updating data stored at the device with the voicemail data received.

7. The method of claim 6, wherein the further user interface comprises a further control to specify that the device is to automatically download the voicemail data.

8. The method of claim 6, wherein the device comprises a smartphone and wherein the voicemail application comprises a visual voicemail application.

9. The method of claim 6, wherein updating the data stored at the device comprises determining that the device is to automatically download the voicemail data without requiring input from a user.

10. A device comprising:

a processor;

a computer readable medium that stores instructions that, when executed by the processor, cause the processor to perform operations comprising presenting a user interface comprising options to control settings associated with a voicemail application, the settings comprising a device setting to selectively disallow data communications and a further device setting to override the device setting, receiving a notification that voicemail data has been deposited at a voicemail system, in response to determining that the further device setting is selected, overriding the device setting to allow the device to obtain the voicemail data, in response to the overriding, establishing a data session with the voicemail system to obtain the voicemail data, obtaining the voicemail data, and updating data stored in the computer readable medium with the voicemail data received.

11. The device of claim 10, wherein the instructions, when executed by the processor, cause the processor to present a further user interface comprising:
- a message waiting indication;
- an indication that the device setting disallows the data communications; and
- an option to override the device setting that disallows the data communications.

12. The device of claim 10, wherein the device comprises a smartphone, and wherein the voicemail application comprises a visual voicemail application.

13. The device of claim 12, wherein the instructions, when executed by the processor, further cause the processor to present a further user interface comprising a visual voicemail inbox having a control to access the voicemail data obtained from the voicemail system.

14. The device of claim 13, wherein the instructions, when executed by the processor, cause the processor to obtain the voicemail data by
- authenticating with the voicemail system; and
- obtaining headers from the voicemail system.

15. The device of claim 14, wherein the instructions, when executed by the processor, further cause the processor to
- in response to detecting selection of the control, obtain the voicemail data by requesting a message from the voicemail system; and
- obtain the message.

16. The device of claim 10, wherein the instructions, when executed by the processor, further cause the processor to receive the notification that the voicemail data has been deposited at the voicemail system as a message waiting indicator message.

17. The device of claim 10, wherein the instructions, when executed by the processor, further cause the processor to present a further user interface comprising a control to access the voicemail data obtained from the voicemail system.

* * * * *